United States Patent
Torabi et al.

(10) Patent No.: US 10,954,914 B2
(45) Date of Patent: Mar. 23, 2021

(54) APPARATUS FOR GENERATING ENERGY

(71) Applicants: Ali Torabi, Niagara-on-the-Lake (CA); Faraz Torabi, Niagara-on-the-Lake (CA)

(72) Inventors: Ali Torabi, Niagara-on-the-Lake (CA); Faraz Torabi, Niagara-on-the-Lake (CA)

(73) Assignees: Ali Torabi, Niagara-on-the-Lake (CA); Faraz Torabi, Niagara-on-the-Lake (CA)

( * ) Notice: Subject to any disclaimer, the term of this patent is extended or adjusted under 35 U.S.C. 154(b) by 0 days.

(21) Appl. No.: 16/472,359

(22) PCT Filed: Dec. 20, 2017

(86) PCT No.: PCT/CA2017/051550
§ 371 (c)(1),
(2) Date: Jun. 21, 2019

(87) PCT Pub. No.: WO2018/112628
PCT Pub. Date: Jun. 28, 2018

(65) Prior Publication Data
US 2019/0360454 A1 Nov. 28, 2019

Related U.S. Application Data

(60) Provisional application No. 62/437,231, filed on Dec. 21, 2016.

(51) Int. Cl.
*F03C 1/02* (2006.01)
*F03B 17/04* (2006.01)
(Continued)

(52) U.S. Cl.
CPC ............ *F03B 17/04* (2013.01); *F03B 17/005* (2013.01); *F03C 1/02* (2013.01); *F03C 1/12* (2013.01); *F03G 7/10* (2013.01)

(58) Field of Classification Search
CPC .......... F03B 17/06; F03B 13/26; F03B 13/16; F03B 13/188; F03B 13/1885; F03B 13/20;
(Continued)

(56) References Cited

U.S. PATENT DOCUMENTS 3,871,268 A * 3/1975 Misima .................... F04B 9/045
92/13.3
4,324,099 A * 4/1982 Palomer ................ F03B 17/025
60/497

(Continued)

FOREIGN PATENT DOCUMENTS

CN 1676926 A 10/2005
EP 2894328 A1 7/2015
(Continued)

OTHER PUBLICATIONS

International Search Report and Written Opinion relating to PCT application No. PCT/CA2017/051550, dated Mar. 29, 2018.

*Primary Examiner* — Shafiq Mian
(74) *Attorney, Agent, or Firm* — Rowand LLP

(57) ABSTRACT

An apparatus for generating energy by intake and drainage of a fluid includes a reservoir and a pair of receptacles in fluid communication with the reservoir and mounted above the reservoir. Each of the pair of receptacles has a variable volume for holding the fluid. The variable volume is controlled by movable portions. The apparatus includes a lever rotatable about a lever pivot. The lever is coupled at a first side of the lever pivot to the movable portions associated with a first one of the pair of receptacles. The lever is coupled at a second side of the lever pivot to moveable portions associated with a second one of the pair of receptacles. The apparatus includes control valves controlling fluid communication between the pair of receptacles and the
(Continued)

reservoir and a controller coupled to the control valves. The apparatus includes a generator coupled to moving portions.

20 Claims, 17 Drawing Sheets

(51) Int. Cl.
*F03B 17/00* (2006.01)
*F03C 1/12* (2006.01)
*F03G 7/10* (2006.01)
*F03B 15/02* (2006.01)

(58) Field of Classification Search
CPC ...... F03B 15/00; F03B 13/24; F03B 13/1845; F03B 13/14; F03B 13/142; F05B 2240/93; F05B 2260/4031; F05B 2220/706; F05B 2240/97; F05B 2280/5001
See application file for complete search history.

(56) References Cited

U.S. PATENT DOCUMENTS

| | | | |
|---|---|---|---|
| 4,583,368 A * | 4/1986 | Neuenschwander | F03G 3/00 60/398 |
| 4,599,857 A | 7/1986 | Kim et al. | |
| 4,720,976 A * | 1/1988 | Kim | F03B 17/025 417/337 |
| 5,970,713 A * | 10/1999 | Iorio | F03G 3/00 60/640 |
| 6,803,670 B2 * | 10/2004 | Peloquin | F03B 17/025 290/42 |
| 2008/0018113 A1 * | 1/2008 | Tal-or | F03B 13/182 290/53 |
| 2008/0092535 A1 | 4/2008 | Razack | |
| 2013/0014499 A1 * | 1/2013 | Gray, Jr. | B60W 10/04 60/327 |

FOREIGN PATENT DOCUMENTS

| | | |
|---|---|---|
| GB | 2553662 A | 3/2018 |
| WO | 2013155083 A1 | 10/2013 |

\* cited by examiner

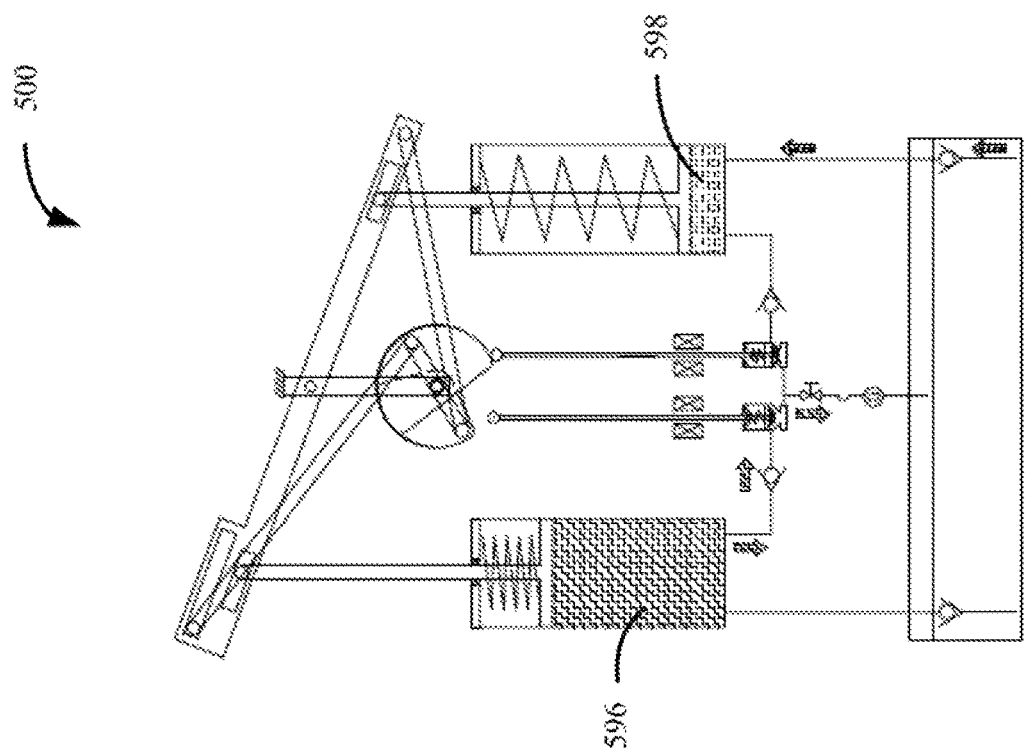
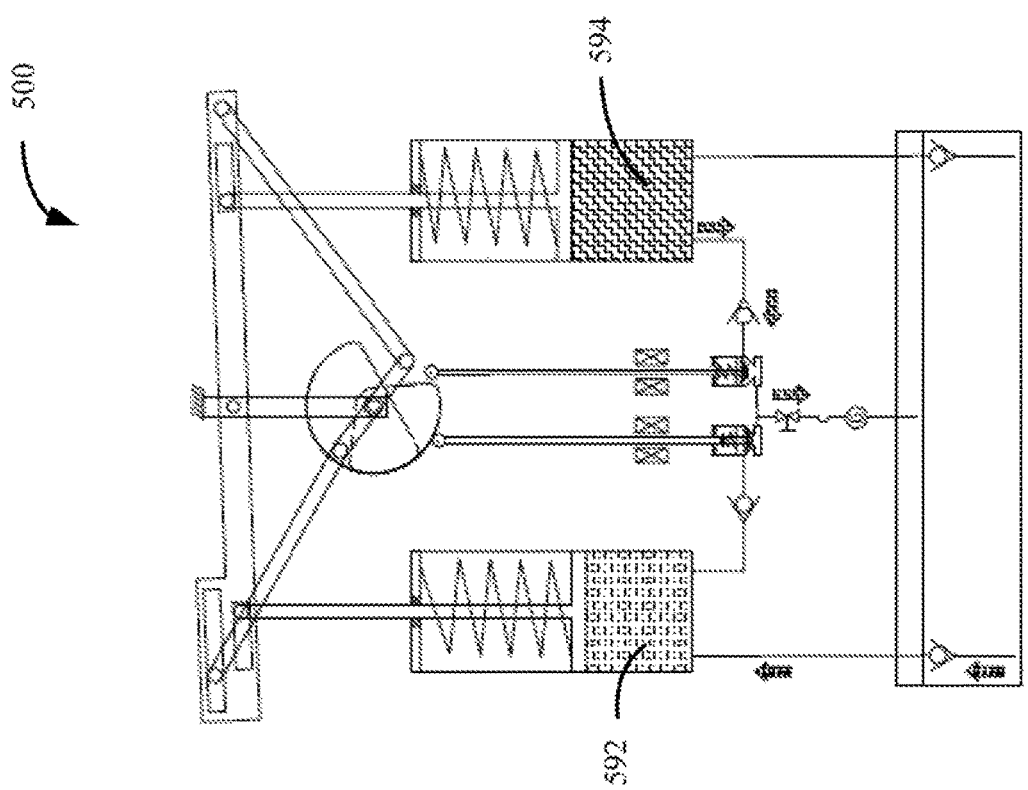

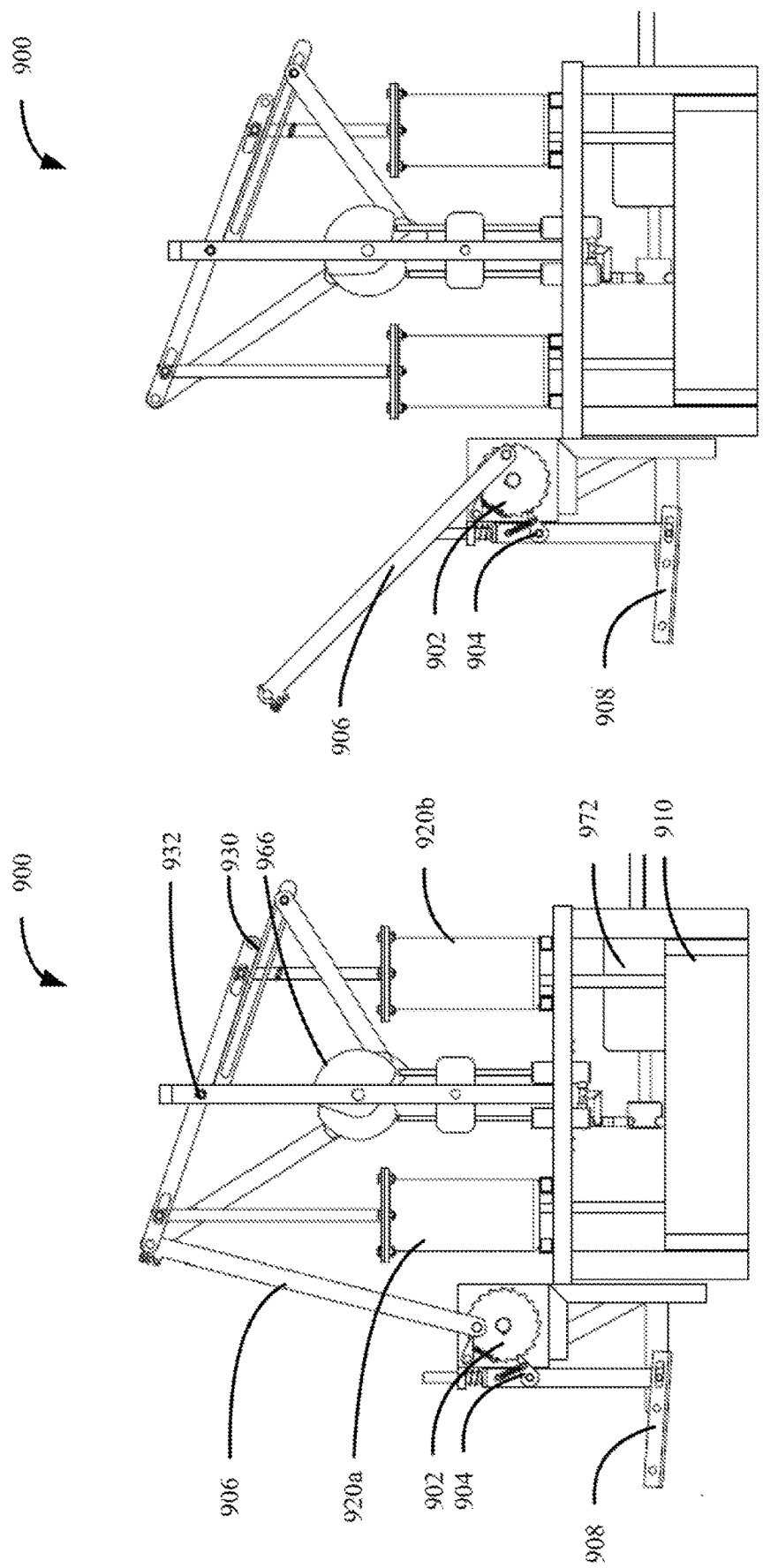

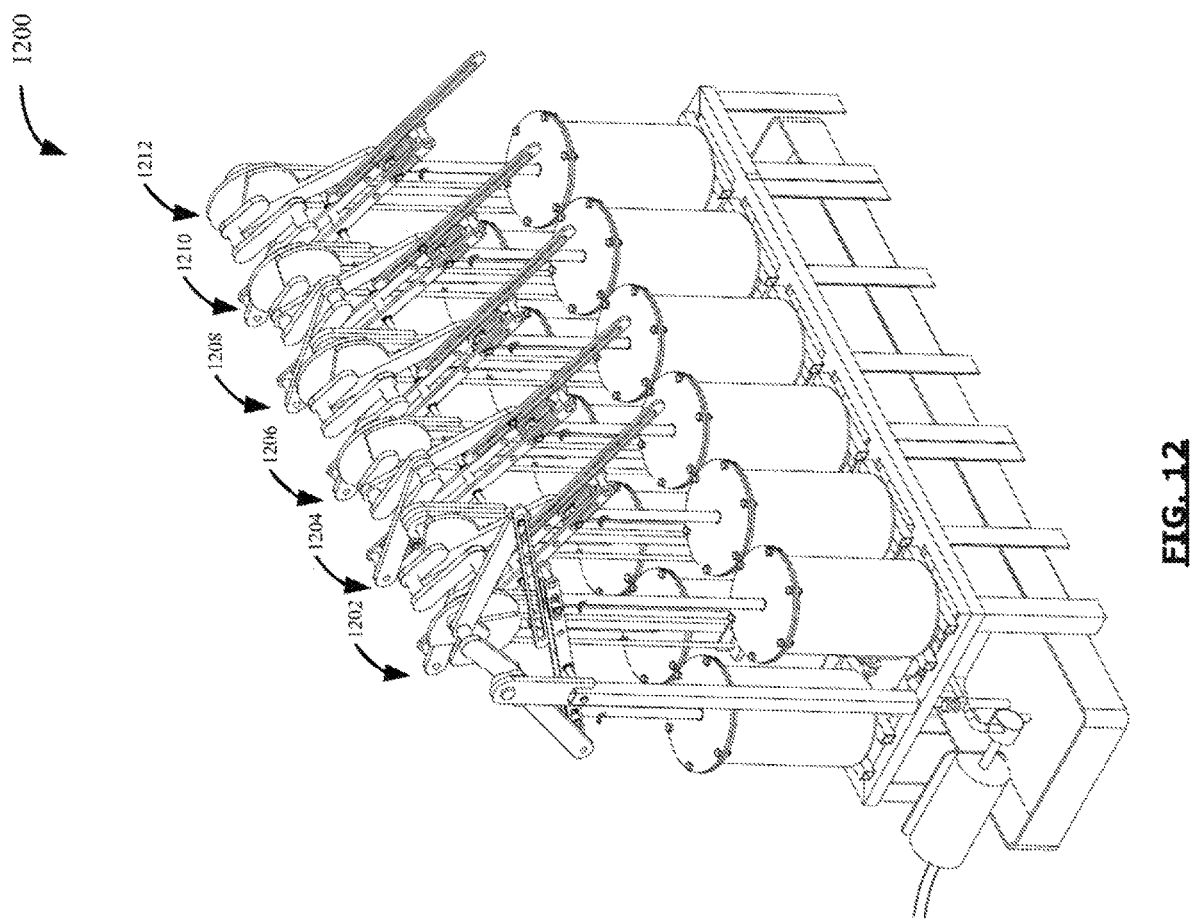

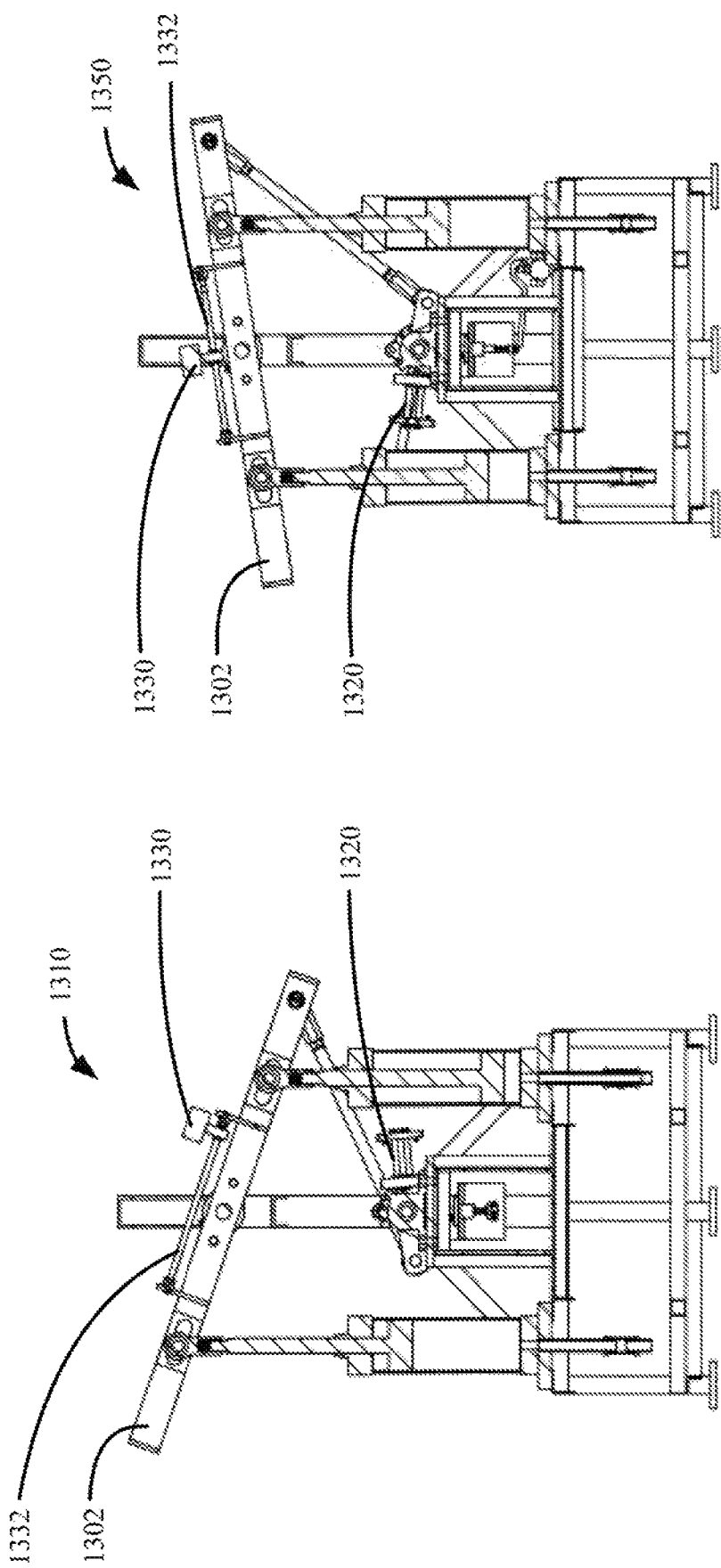

APPARATUS FOR GENERATING ENERGY

FIELD

The present application generally relates to an apparatus for generating energy, and in particular an apparatus for generating movement based on intake and drainage of fluids.

BACKGROUND

As the world population continues to grow, the demand for energy continues to grow. Current systems and methods of generating energy may be subject to limitations, such as input resource, efficiency, time, and/or geographic constraints. Accordingly, to keep up with the increasing demand for generating energy, different apparatus and methods for generating energy are being sought.

BRIEF DESCRIPTION OF THE DRAWINGS

Reference will now be made, by way of example, to the accompanying drawings which show example embodiments of the present application, and in which:

FIGS. 5A, 5B, and 5C are side elevation plan views of an apparatus illustrated at three different points in time, respectively, during operation in accordance with an embodiment of the present application;

FIGS. 9A and 9B are side elevation views of an apparatus for generating energy in accordance with an embodiment of the present application;

FIG. 12 is a perspective view of a system for generating energy in accordance with an embodiment of the present application;

FIG. 15B is a side elevation sectional view of a first apparatus illustrated in FIG. 13 taken along the line I-I; and FIG. 15C is a side elevation sectional view of a second apparatus illustrated in FIG. 13 taken along the line J-J.

Similar reference numerals may have, been used in different figures to denote similar components.

DESCRIPTION OF EXAMPLE EMBODIMENTS

In a one aspect, the present application describes an apparatus for generating energy by intake and drainage of a fluid. The apparatus includes a reservoir for receiving at least a portion of the fluid. The apparatus also includes a pair of receptacles in fluid communication with the reservoir and mounted above the reservoir. Each of the pair of receptacles have a variable volume for holding the fluid. The variable volume is controlled by movable portions in each of the pair of receptacles. The apparatus also includes a lever rotatable about a lever pivot. The lever is coupled at a first side of the lever pivot to the movable portions associated with a first one of the pair of receptacles and coupled at a second side of the lever pivot to the movable portions associated with a second one of the pair of receptacles. Movement of the movable portions that decrease the variable volume in the first one of the pair of receptacles induces, via the lever, a corresponding movement of the moveable portions which increases the variable volume in the second one of the pair of receptacles. The apparatus also includes control valves controlling the fluid communication between the pair of receptacles and the reservoir. The apparatus also includes a controller coupled to the control valves. The controller is configured to alternatingly configure one of the pair of receptacles to enable draining to the reservoir while configuring another of the pair of receptacles to prevent draining to the reservoir but to allow suction from the reservoir. The apparatus also includes a generator coupled to moving portions and activated by communication of fluids between the pair of receptacles and the reservoir.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Figure 1:
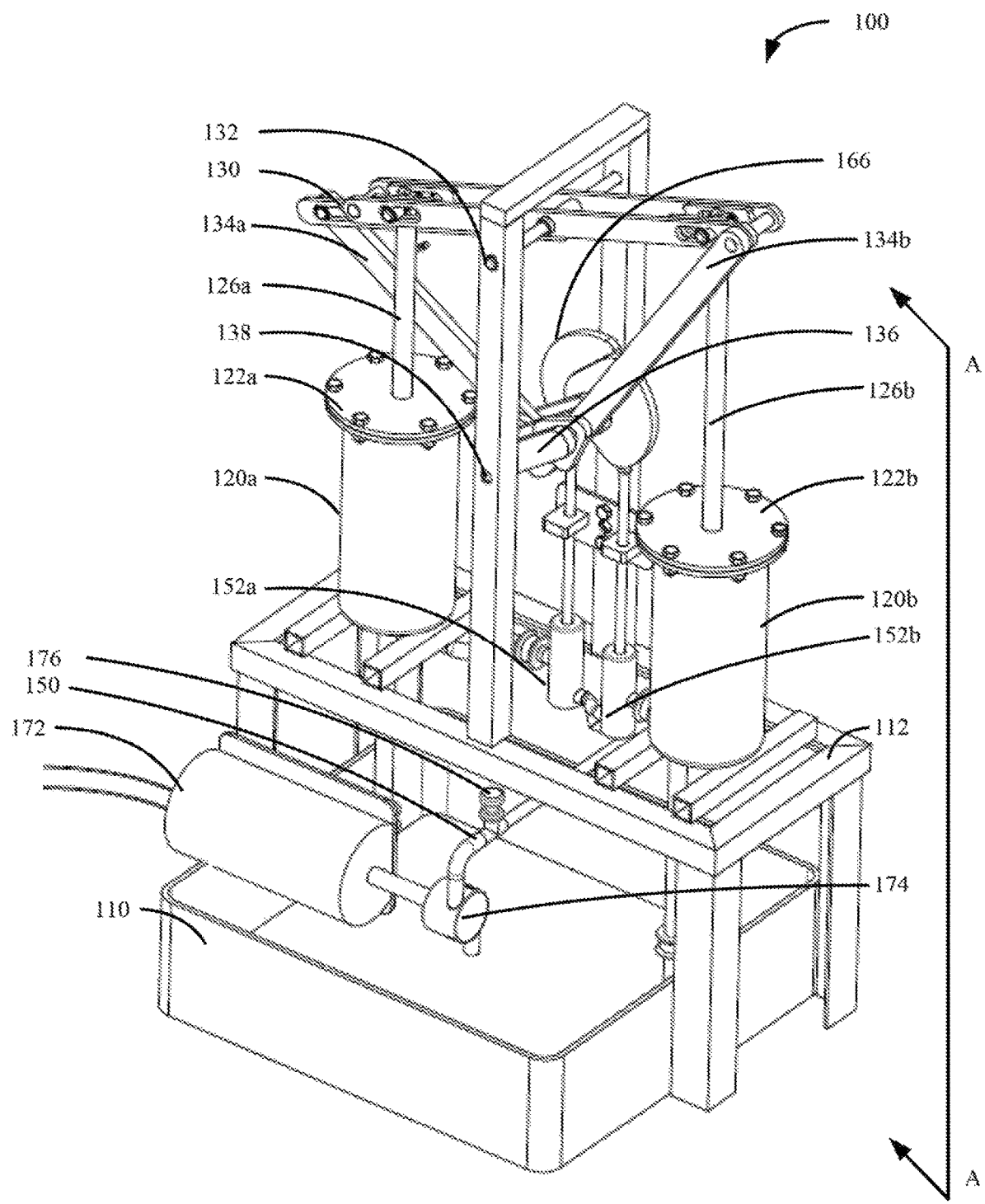
FIG. 1 is a perspective view of an apparatus for generating energy in accordance with an embodiment of the present application.

Reference is now made to FIG. 1, which is a perspective view of an apparatus 100 for generating energy in accordance with an embodiment of the present application. Simultaneous reference will be made to FIG. 2, which is a side elevation sectional view of the apparatus 100 illustrated in FIG. 1 taken along the line A-A. Because the illustration in FIG. 2 is a sectional view taken along the line A-A, certain features shown in FIG. 1 may not be illustrated in FIG. 2.

Figure 2:
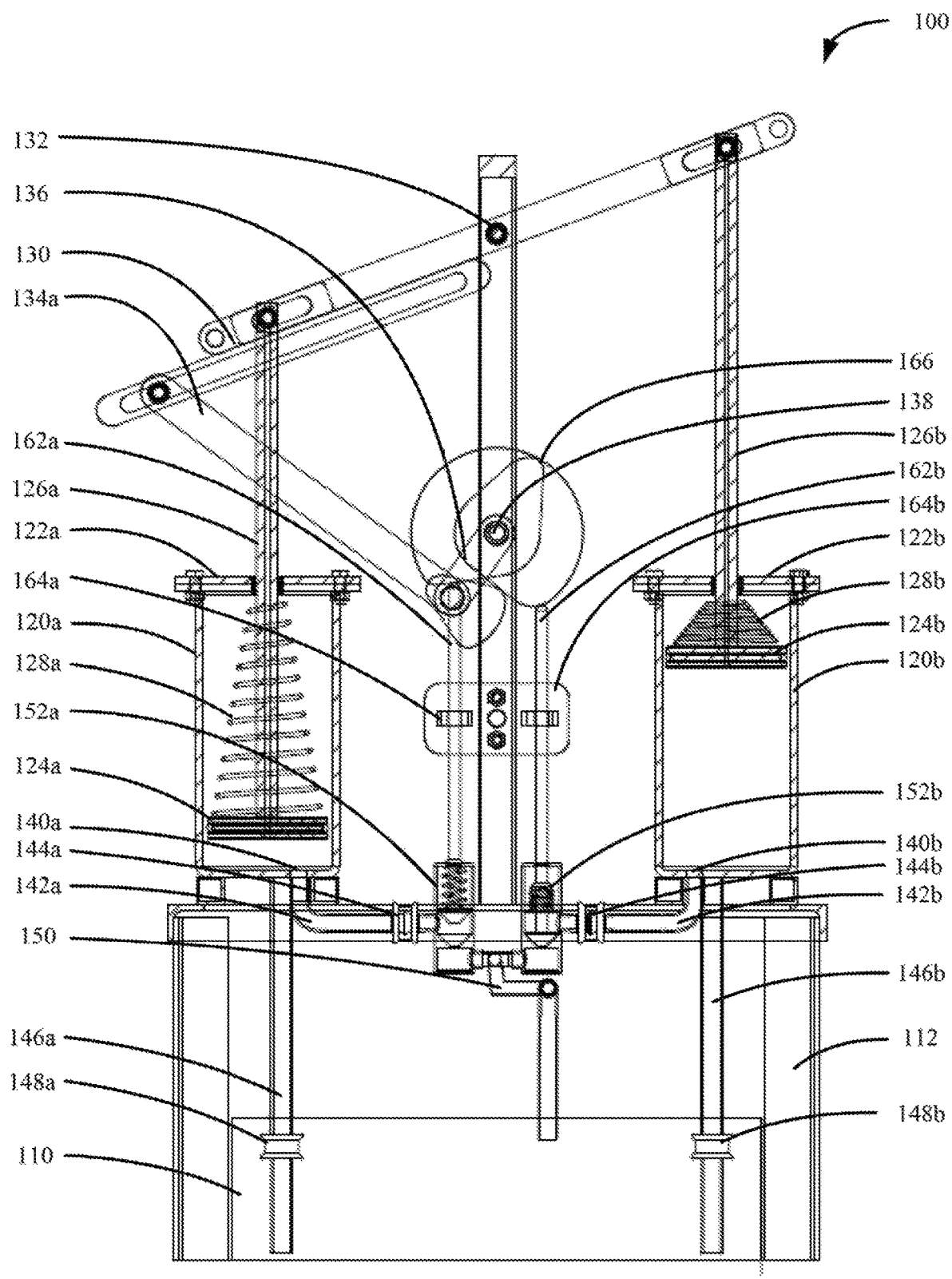
FIG. 2 is a side elevation sectional view of the apparatus illustrated in FIG. 1 taken along the line A-A.

The apparatus 100 includes a reservoir 110 for receiving a fluid (not illustrated in FIG. 1 and FIG. 2). In some embodiments, the reservoir 110 may be an open reservoir. For example, the reservoir 110 may not include a top cover for enclosing the fluid contained within the reservoir 110. In some other embodiments, the reservoir 110 may include a top cover, where the top cover contains openings for input and output, of fluid to and from the reservoir 110.

In some embodiments, the fluid may be a non-compressible or an incompressible fluid. For example, a non-compressible or an incompressible fluid may be a fluid which may not reduce in volume when subjected to an increase in pressure. In some embodiments, the non-compressible or incompressible fluid may include hydraulic oils. In some other embodiments, the non-compressible or incompressible fluid may include water. In some other embodiments, the non-compressible or incompressible fluid may include a mixture of water and alcohol.

The apparatus 100 also includes a pair of receptacles 120a, 120b in fluid communication with the reservoir 110. In some embodiments, each of the pair of receptacles 120a, 120b may also include a top cover 122a, 122b.

Each of the pair of receptacles 120a, 120b may include a variable volume for holding or containing a fluid. For example, each of the pair of receptacles 120a, 120b may be used to contain a fluid such as a non-compressible fluid.

A variable volume may be controlled by movable portions within each of the pair of receptacles 120a, 120b. In some embodiments, the movable portions may include a piston 124a, 124b (FIG. 2) that is movable within each of the pair of receptacles 120a, 120b. For example, a first receptacle may include a first piston movable within the first receptacle such that the variable volume for holding fluid within the first receptacle may increase or decrease. A second receptacle may include a second piston movable within the second receptacle such that the variable volume for holding fluid within the second receptacle may increase or decrease. Accordingly, the variable volume for holding or containing fluid may be defined by a piston 124a, 124b and receptacle walls.

Referring to FIG. 2, when a piston 124a, 124b moves upwards within one of the pair of receptacles 120a, 120b, the variable volume for holding fluid within the one of the pair of receptacles 120a, 120b may increase. That is, the piston 124a, 124b may move upwards within a receptacle and may increase, the volume that is circumscribed by the piston 124a, 124b and receptacle walls. When a piston 124a, 124b moves downwards within one of the pair of receptacles 120a, 120b, the variable volume for holding fluid within the one of the pair of receptacles 120a, 120b may decrease. That is, the piston 124a, 124b may move downwards within a receptacle and may decrease the volume that is circumscribed by the piston 124a, 124b and receptacle walls.

Each piston 124a, 124b includes a piston perimeter edge that may be in sliding communication with receptacle walls of a respective receptacle in the pair of receptacles 120a, 120b. For example, the pair of receptacles 120a, 120b may be cylinders and each of the pair of receptacles 120a, 120b may have a piston 124a, 124b movable within the cylinder. The diameter of a piston 124a, 124b may be smaller than the diameter of a respective receptacle in the pair of receptacles 120a, 120b. The flame contained within the pair of receptacles 120a, 120b may be circumscribed by the pistons 124a, 124b and receptacle walls of the respective receptacle in the pair of receptacles 120a, 120b. In the embodiment illustrated in FIG. 2, the pistons 124a, 124b may be in sliding communication with receptacle walls. Accordingly, the pistons 124a, 124b may prohibit fluid from flowing into the portion of the pair of receptacles 120a, 120b that is above the pistons 124a, 124b. As will be apparent in the description that follows, because the pistons 124a, 124b may be in sliding communication with receptacle walls, fluid may be drawn into the pair of receptacles 120a, 120b by suction created by the pistons 124a, 124b moving within the pair of receptacles.

In some embodiments, the pistons 124a, 124b may include a seal around the respective piston perimeter edges for ensuring that the fluid does not flow to an upper portion of the respective pair of receptacles 120a, 120b that is above the pistons 124a, 124b.

In some embodiments, the movable portions may include one or more springs 128a, 128b (FIG. 2). The one or more springs 128a, 128b may be coupled, at one end, to a top cover 122a, 122b. In some embodiments, the one or more springs 128a, 128b may be fastened to the top cover 122a, 122b. In some other embodiments, the one or more springs 128a, 128b may touch and maintain contact with the top cover 122a, 122b when elastic forces of the one or more springs 128a, 128b push against the top cover 122a, 122b.

The one or more springs 128a, 128b may be coupled, at another end, to a piston 124a, 124b of one of the pair of receptacles 120a, 120b. In some embodiments, the one or more springs 128a, 128b may be fastened to the piston 124a, 124b. In some other embodiments, the one or more springs 128a, 128b may, at the other end, touch and maintain contact with the piston 124a, 124b when elastic forces of the one or more springs 128a, 128b push against the piston 124a, 124b. Accordingly, potential energy may be stored in the one or more springs 128a, 128b when the one or more springs 128a, 128b are compressed from movement of a piston 124a, 124b in an upward direction within a respective receptacle. When a piston 124a, 124b moves in a downward direction within a respective receptacle, the stored potential energy may be released and may contribute towards urging the respective piston 124a, 124b in a downward direction within the respective receptacle. That is, the one or more springs 128a, 128b may generate a compression three to assist with decreasing the variable volume in the pair of receptacles 120a, 120b.

In some embodiments, the one or more springs 128a, 128b may be a coil spring. The coil spring may have a series of helical portions, and each of the series of helical portions may have the same circular diameter as another helical portion in the coil spring.

In some other embodiments, the one or more springs 128a, 128b may be a conical spring (see e.g., FIG. 2). For example, the conical spring may have a series of helical portions, and each of the series of helical portions may have a different circular diameter than another helical portion in the conical spring. Accordingly, when a conical spring is at maximum compression, the thickness of the helical portions may be less than the total thickness of the helical portions of a coil spring at maximum compression.

Although the apparatus 100 of FIG. 2 illustrates one or more springs 128a, 128b, in some embodiments, the apparatus 100 of FIG. 2 may not include the one or more springs 128a, 128b. That is, the apparatus 100 may operate without the one or more springs 128a, 128b.

Each of the pair of receptacles 120a, 120b may include a drainage outlet 140a, 140b (FIG. 2) in fluid communication with the reservoir 110. The drainage outlet 140a, 140b may be positioned at a lower portion of a receptacle, such that when the drainage outlet 140a, 140b is unimpeded, gravitational forces may cause fluid to pass through the drainage outlet 140a, 140b.

The apparatus 100 may also include drainage conduits. For example each of the pair of receptacles 120a, 120b may include one or more drainage conduits in communication with the reservoir 110. Referring to FIG. 2, a first receptacle in the pair of receptacles 120a, 120b may include a first drainage conduit 142a and a second receptacle in the pair of receptacles 120a, 120b may include a second drainage conduit 142b. The first drainage conduit 142a and the second drainage conduit 142b may facilitate fluid flow from a respective receptacle to the reservoir 110.

In some embodiments, the apparatus 100 may include a drainage collection conduit 150 (FIG. 2) for merging the first drainage conduit 142a and the second drainage conduit 142b. For example, the drainage collection conduit 150 may collect fluid from each of the first drainage conduit 142a and the second drainage conduit 142b and may provide a common path for draining fluid to the reservoir 110.

The apparatus 100 also includes control valves 152a, 152b for controlling the fluid communication between the pair of receptacles 120a, 120b and the reservoir 110. In some embodiments, the control valves 152a, 152b may be positioned at a drainage outlet 140a, 140b and may control the fluid communication between the pair of receptacles 120a, 120b and the reservoir 110. That is, when a control valve is in a closed mode, the control valve prevents fluid from draining from a receptacle to the reservoir 110. That is, when a control valve is in a closed mode, the control valve prevents passage of fluid through the control valve. When the control valve is in an open mode, the control valve allows fluid to drain from a receptacle to the reservoir 110. That is, when a control valve is in an open mode, the control valve allows passage of fluid through the control valve.

In some embodiments, the control valves 152a, 152b may be positioned at an end of a drainage conduit that is nearer to the reservoir 110 than the pair of receptacles 120a, 120b. In some other embodiments, the control valves 152a, 152b may be installed within a drainage conduit at some distance between respective ends of the drainage conduit. That is, in some embodiments, a drainage conduit may pass through control valves 152a, 152b to the reservoir 110.

As will be apparent from the present description, in some embodiments, the control valves 152a, 152b may be configured to enable a first receptacle of the pair of receptacles 120a, 120b to drain fluid to the reservoir 110 while preventing a second receptacle of the pair of receptacles 120a, 120b from draining fluid to the reservoir 110 but to promote suction of fluid from the reservoir 110 to the second receptacle.

The apparatus 100 may also include a first drainage one-way check valve 144a and a second drainage one-way check valve 144b installed along the path of the first drainage conduit 142a and the second drainage conduit 142b, respectively. For example, the first drainage one-way check valve 144a and the second drainage one-way check valve 144b may allow fluid to flow in a direction from a receptacle to the reservoir 110 via a drainage conduit, but may disallow fluid to flow in the opposite direction. That is, the first drainage one-way check valve 144a and the second drainage one-way check valve 144b may disallow fluid to flow in a direction from the reservoir 110 to a receptacle via the first drainage conduit 142a and the second drainage conduit 142b, respectively.

The apparatus 100 may also include suction conduits. For example, each of the pair of receptacles 120a, 120b may include one or more suction conduits in communication with the reservoir 110. Referring to FIG. 2, a first receptacle in the pair of receptacles 120a, 120b may include a first suction conduit 146a. A second receptacle in the pair of receptacles 120a, 120b may include a second suction conduit 146b. The first suction conduit 146a and the second suction conduit 146b may facilitate fluid flow from the reservoir 110 to the pair of receptacles 120a, 120b.

In some embodiments, the apparatus 100 may include a first suction one-way check valve 148a and a second suction one-way check valve 148b installed along the path of the first suction conduit 146a and the second suction conduit 146b, respectively. For example, the first suction one-way check valve 148a and the second suction one-way check valve 148b may allow fluid to flow in a direction from the reservoir 110 to one of the pair of receptacles 120a, 120b via a suction conduit, but may disallow fluid to flow in the opposite direction. That is, the first suction one-way check valve 148a and the second suction one-way check valve 148b may disallow fluid to flow in a direction from a receptacle to the reservoir 110 via the first suction conduit 146a and the second suction conduit 146b, respectively.

In some embodiments, the distance that the first suction conduit 146a and the second suction conduit 146b may extend into the reservoir 110 may be greater than the distance that the drainage collection conduit 150 may extend into the reservoir 110. Although not illustrated in FIG. 2, in some embodiments, the first suction conduit 146a and the second suction conduit 146b may be immersed in fluid that is contained within the reservoir 110 and the drainage collection conduit 150 may not be immersed in the fluid that is contained within the reservoir 110.

In some other embodiments, each of the first suction conduit 146a, the second suction conduit 146b, and the drainage collection conduit 150 may be immersed in the fluid contained within the reservoir 110.

As described, the apparatus 100 includes the pair of receptacles 120a, 120b in fluid communication with the reservoir 110. In some embodiments, the pair of receptacles 120a, 120b may be mounted above the reservoir 110, such that fluid contained within the pair of receptacles 120a, 120b may drain based, in part, on gravitational forces. In some embodiments, the pair of receptacles 120a, 120b may be mounted on and supported by a frame 112. The frame 112 may support the pair of receptacles 120a, 120b and other components of the apparatus 100, such that the pair of receptacles 120a, 120b may be in fluid communication with the reservoir 110.

Although the frame 112 illustrated in FIG. 1 is a rectangular, four legged frame, the frame 112 may be of any other shape or configuration for supporting the pair of receptacles 120a, 120b and any other components of the apparatus 100 above the reservoir 110.

In some embodiments, the movable portions (e.g., piston 124a, 124b in FIG. 2 in the pair of receptacles 120a, 120b) may further include one or more piston rods. For example, a first piston rod 126a may be coupled at one end to one of the pistons 124a, 124b and a second piston rod 126b may be coupled at one end to another of the pistons 124a, 124b.

The apparatus 100 also includes a lever 130 rotatable about a lever pivot 132. The lever 130 may be coupled at a first side of the lever pivot 132 to the movable portions associated with a first one of the pair of receptacles 120a, 120b. The lever 130 may be coupled at a second side of the lever pivot 132 to the movable portions associated with a second one of the pair of receptacles 120a, 120b. Accordingly, movement of movable portions that decrease the variable volume in the first one of the pair of receptacles 120a, 120b induces, via the lever 130, a corresponding movement of the moveable portions which increases the variable volume in the second one of the pair of receptacles 120a, 120b.

For example, as illustrated in FIG. 2, the lever 130 may be coupled at a first side of the lever pivot 132 to one of the pistons 124a, 124b via the first piston rod 126a. Further, the lever 130 may be coupled at a second side of the lever pivot 132 to another of the pistons 124a, 124b via the second piston rod 126b. As will become apparent in the description that follows, movement of one of the pistons 124a, 124b that decrease the variable volume in the first one of the pair of receptacles 120a, 120b induces, via the lever 130, a corresponding movement of the other of the pistons 124a, 124b which increases the variable volume in the second one of the pair of receptacles 120a, 120b. Accordingly, the lever 130 may move in a "see-saw" type fashion about the lever pivot 132 as a decrease of the variable volume in the first one of the pair of receptacles 120a, 120b induces a corresponding increase of the variable volume in the second one of the pair of receptacles 120a, 120b.

In some embodiments, the apparatus 100 also includes a crank 136 (FIG. 1 and FIG. 2) coupled to the lever 130 via a first crank arm 134a (FIG. 1 and FIG. 2) and a second crank arm 134b (FIG. 1, not illustrated in FIG. 2 sectional view). The crank 136 is rotatable about a crank pivot 138. Accordingly, when the lever 130 moves in a "see-saw" type fashion about the lever pivot 132, the first crank arm 134a and the second crank arm 134b couples the lever 130 to the crank 136 and generates rotational movement of the crank 136 about the crank pivot 138.

The apparatus 100 also includes a controller coupled to the control valves 152a, 152b. As will become apparent in the description that follows, the controller may be coupled to the control valves 152a, 152b for regulating drainage of fluid contained within one or both of the pair of receptacles 120a, 120b to the reservoir 110. For example, the controller may regulate whether and when fluid contained in the pair of receptacles 120a, 120b is permitted to flow from one or both of the pair of receptacles 120a, 120b to the reservoir 110. In some embodiments, gravitational forces acting on the fluid may cause the fluid to flow from one or both of the pair of receptacles 120a, 120b into the reservoir 110.

In some embodiments, the controller may include a pair of cam followers 162a, 162b and a pair of cams 166 (FIG. 2). Each of the pair of cam followers 162a, 162b may be in communication, at one end, with one of the control valves 152a, 152b. Each of the pair of cam followers 162a, 162b may be in communication, at another end, with the pair of cams 166.

In some embodiments, the apparatus 100 may include cam bearings 164a, 164b (FIG. 2). The cam bearings 164a, 164b may be affixed to the frame 112 and may provide support for the cam followers 162a. 162b or may act as a guide for linear motion of the cam followers 162a, 162b.

The pair of cams 166 may be rotatable about the crank pivot 138. Each cam in the pair of cams 166 may rotate adjacent another cam in the pair of cams 166. Each of the pair of cams 166 may include a first engagement portion for translating rotary motion into a first linear distance and a second engagement portion for translating rotary motion into a second linear distance. The first engagement portion of one of the pair of cams 166 may coincide, at least in part, with the second engagement portion of a second one of the pair of cams 166.

Further, the second engagement portion of the first one of the pair of cams 166 may coincide, at least in part, with the first engagement portion of the second one of the pair of cams 166. Accordingly, when the pair of cams 166 rotate about, the crank pivot 138, the rotation of the pair of cams 166 translates, via the pair of cam followers 162a, 162b, a first linear distance to one of the control valves 152a, 152b while translating a second linear distance to another of the control valves 152a, 152b to alternatingly configure one of the pair of receptacles 120a, 120b to enable draining while another of the pair of receptacles 120a, 120b to prevent draining.

As described, the pair of cams 166 may be rotatable about the about the crank pivot 138 and may be coupled to the lever 130 via the crank 136, the first crank arm 134a, and the second crank arm 134b. Accordingly, the pair of cams 166 may rotate about the crank pivot 138 to translate rotary motion into a first linear distance and a second linear distance to a pair of cam followers 162a, 162b for setting an open mode and a closed mode for control valves 152a, 152b. For example, at a discrete point in time, the pair of cams 166 may configure one of the control valves 152a, 152b to be in an open mode and the other of the control valves 152a, 152b to be in a closed mode. Alternatively, when the one of the control valves 152a, 152b may be in a closed mode, the other of the control valves 152a, 152b may be in an open mode. Accordingly, at the discrete point in time, fluid within one of the pair of receptacles 120a, 120b will be draining into the reservoir 110 and the fluid within another of the pair of receptacles 120a, 120b will not be draining into the reservoir 110. That is, the pair of cams 166 may be configured to have one of the control valves 152a, 152b in an open mode, while the other of the control valves 152a, 152b in a closed mode.

Although the example controller described above includes a first cam rotating adjacent a second cam in the pair of cams 166, in some embodiments, the first cam and the second cam may be adjoined, such that the first cam and the second cam forms a rotating cam module. For example, instead of including two or more cam components rotating adjacent another, the pair of cams may be a unitary component rotatable about the crank pivot 138.

In some other embodiments, the controller may include a pair of fluid level sensors affixed to receptacle walls (not illustrated in FIG. 1 and FIG. 2). For example, the controller may include the pair of fluid level sensors instead of the pair of cams 166 and the pair of cam followers 162a, 162b for regulating drainage of fluid contained within one or both of the pair of receptacles 120a, 120b to the reservoir 110. The fluid level sensors may be in communication with the control valves 152a, 152b. For example, the fluid level sensors may be in wireless communication with the control valves 152a, 152b and may be configured to detect a fluid volume increasing beyond a first threshold in a respective receptacle of the pair of receptacles 120a, 120b.

For example, a first sensor of the pair of fluid level sensors may be positioned within one of the pair of receptacles 120a, 120b and another of the pair of fluid level sensors may be positioned within another of the pair of receptacles 120a, 120b. The pair of fluid level sensors may be configured to detect when fluid within at least one of the pair of receptacles 120a, 120b increases beyond a first threshold. In some embodiments, the first threshold may be associated with the maximum fluid volume capacity of each of the pair of receptacles 120a, 120b. For example, the first threshold may indicate that one of the pair of receptacles is filled with fluid (e.g., maximum capacity) and that fluid should be drained to prevent overflow. In some other embodiments, the first threshold may be associated with any other point within the pair of receptacles 120a, 120b and may indicate when fluid should be drained.

In some other embodiments, the controller may include a pair of piston position sensors affixed to receptacle walls (not illustrated in FIG. 1 and FIG. 2). The piston position sensors may be in wireless communication with the control valves 152a, 152b and may be configured to detect when a piston 124a, 124b has moved past the piston position sensor from a lower position to a higher position. The piston position sensor may be configured to detect when a piston 124a, 124b has reached a position that requires the control valves 152a, 152b to be actuated or switched from an open mode to a closed mode, or vice versa.

Although fluid level sensors and/or piston positions sensors may be coupled to control valves 152a, 152b by a wireless communication method, the fluid level sensors and/or piston position sensors may be coupled to the control valves 152a, 152b using a wired communication method.

The apparatus 100 may include a generator coupled to moving portions. As will be described in the description that follows, the generator may be coupled, for example, to one or more features of the apparatus 100, such as the crank 136 and/or the lever 130. In some other examples, the generator may be coupled at an output of the drainage collection conduit 150, where fluid may be draining. The generator may be activated by communication of fluids between the pair of receptacles 120a, 120b and the reservoir 110. In some embodiments, the apparatus 100 may include a hydroelectric generator 172 (FIG. 1). In some embodiments, the hydroelectric generator 172 may include an impeller 174 (FIG. 1) that is rotatable about an impeller pivot coupled at an output of a drainage collection conduit 150. Accordingly, when fluid drains from the pair of receptacles 120a, 120b to the reservoir 110, the draining fluid may rotate the impeller 174, such that rotation of the impeller 174 may be used by the hydroelectric generator 172 for generating electrical energy. Although the hydroelectric generator 172 and the impeller 174 are described as separate components, in some embodiments, the impeller 174 may be a feature that is part of the hydroelectric generator 172.

Although the hydroelectric generator 172 may be coupled at the output of a drainage collection conduit 150, the hydroelectric generator 172 may also be coupled at an outlet end of one or both of the first drainage conduit 142a or the second drainage conduit 142b.

In some embodiments, a generator may be coupled to a crank 136 rotating about a crank pivot 138 (note: generator coupled to crank 136 is not illustrated in FIG. 1 and FIG. 2) to translate rotational or physical movement of the moveable portions of the pair of receptacles, via the lever 130 and/or the crank 136, into electrical energy. For example, movement of the pistons 124a, 124b within the pair of receptacles 120a, 120b may cause the lever 130 to move in a "see-saw" fashion. The "see-saw" motion in the lever 130 may be coupled, via the first crank arm 134a and the second crank arm 134b, to the crank 136. Rotation of the crank 136 may be used by a generator for generating electrical energy in some embodiments, a generator may also be coupled at the lever pivot 132 (note: generator coupled to lever pivot 132 not illustrated in FIG. 1 and FIG. 2) to translate movement of the lever 130 into electrical energy.

In some embodiments, the apparatus 100 may include a variable flow valve 176 (FIG. 1) fitted on the drainage collection conduit 150. The variable flow valve 176 may control the speed of fluid flow draining from the pair of receptacles 120a, 120b to the reservoir 110. For example, the variable flow valve 176 may be a globe valve for regulating flow in a conduit. In another example, the variable flow valve 176 may be a needle valve. In another example, the variable flow valve 176 may be butterfly valve. Accordingly, the variable flow valve 176 may be any type of valve for isolating or regulating fluid flow through the drainage collection conduit 150.

In some embodiments, the variable flow valve 176 may completely halt fluid flow through the drainage collection conduit 150. When fluid flow through the drainage collection conduit 150 is halted by the variable flow valve 176, fluid may not drain from one or both of the pair of receptacles 120a, 120b and may cause the movable portions of the pair of receptacles 120a, 120b to be in a stationary state. Alternatively, the variable flow valve 176 may reduce the flow rate of the fluid passing through the drainage collection conduit 150. When the flow rate of fluid passing through the drainage collection conduit 150 is reduced, the movement rate of the movable portions of the pair of receptacles 120a, 120b may be proportionally reduced. Accordingly, the variable flow valve 176 may be used to control the rate of movement of features of the apparatus 100.

Figure 3:
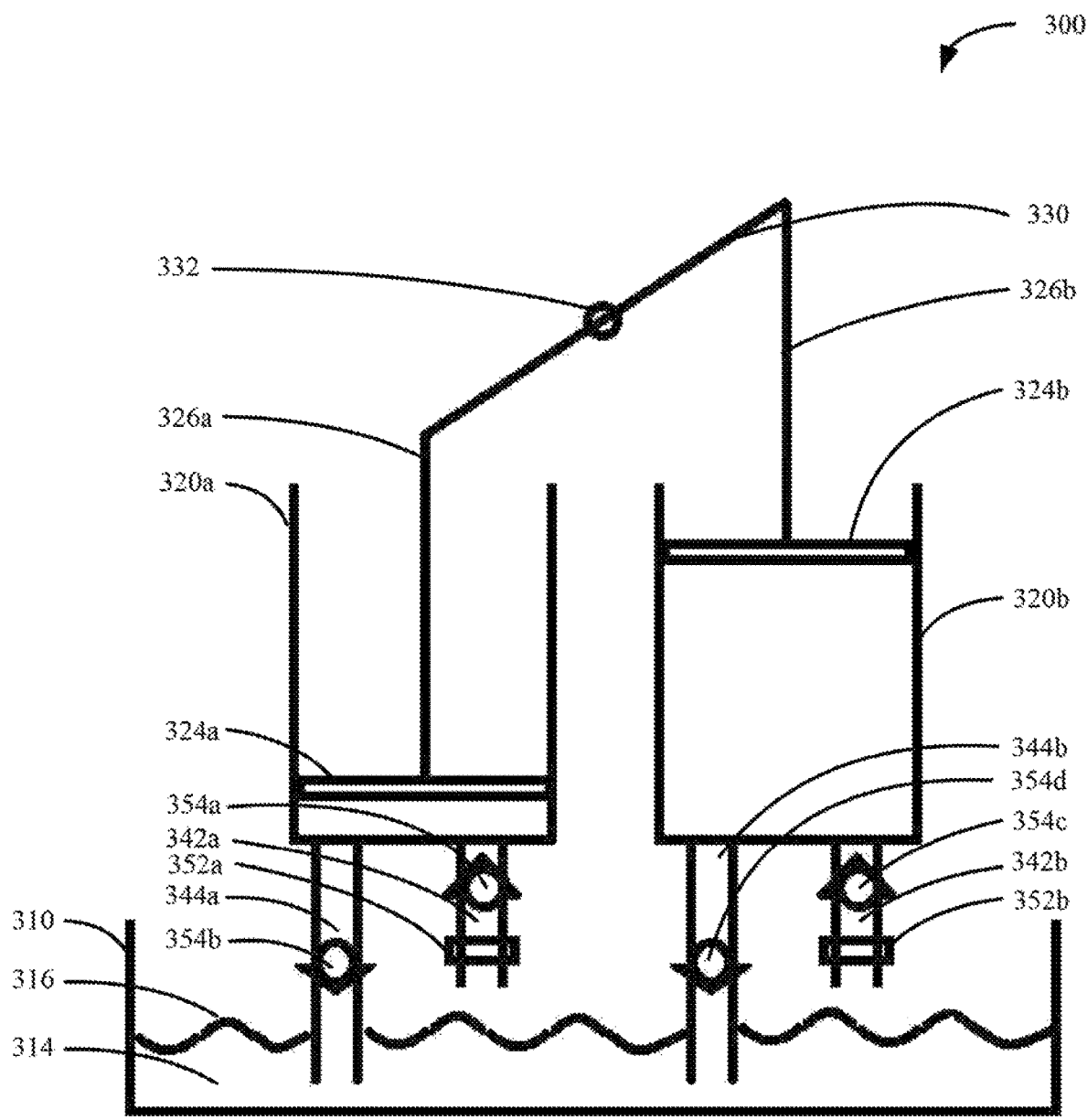
FIG. 3 is a side elevation plan view of an apparatus for generating energy in accordance with another embodiment of the present application.

Reference is now made to FIG. 3, which is a side elevation plan view of an apparatus 300 for generating energy in accordance with another embodiment of the present application. For ease of exposition, certain features of the apparatus 300 have not been illustrated. For example, features of a controller or crank shafts are not illustrated so that features of the receptacles may be highlighted.

The apparatus 300 includes a reservoir 310 for receiving fluid 314. The apparatus 300 also includes a first receptacle 320a and a second receptacle 320b in communication with the reservoir 310. Each of the first receptacle 320a and the second receptacle 320b has a variable volume for holding fluid 314. The fluid 314 may be drawn into the first receptacle 320a and the second receptacle 320b.

The apparatus 300 includes a first piston 324a moveable within the first receptacle 320a and a second piston 324b movable within the second receptacle 320b. The variable volume for the first receptacle 320a may be defined by walls of the first receptacle 320a and the first piston 324a. The variable volume for the second receptacle 320b may be defined by walls of the second receptacle 320b and the second piston 324b.

Movement of the first piston 324a within the first receptacle 320a controls the variable volume within the first receptacle 320a. For example, in FIG. 3, when the first piston 324a moves in a direction towards the reservoir 310, the variable volume for the first receptacle 320a may decrease. When the first piston 324a moves in a direction away from the reservoir 310, the variable volume for the first receptacle 320a may increase.

Similarly, movement of the second piston 324b within the second receptacle 320b controls the variable volume within the second receptacle 320b. For example, in FIG. 3, when the second piston 324b moves in a direction towards the reservoir 310, the variable volume for the second receptacle 320b may decrease. When the second piston 324b moves in a direction away from the reservoir 310, the variable volume for the second receptacle 320b may increase.

The first piston 324a may be sized to move within the first receptacle 320a such that a perimeter of the first piston 324a may be in sliding communication with receptacle walls of the first receptacle 320a. Accordingly, the variable volume for the first receptacle 320a may be the volume circumscribed by the receptacle walls and the first piston 324a. Because the perimeter of the first piston 324a is in sliding communication with the receptacle walls of the first receptacle 320a, the variable volume for the first receptacle 320a may be situated below the first piston 324a and the first piston 324a may prohibit fluid 314 from traveling beyond the first piston 324a in an upward direction.

Similarly, the second piston 324b may be sized to move within the second receptacle 320b such that a perimeter of the second piston 324b may be in sliding communication with the receptacle walls of the second receptacle 320b. Accordingly, the variable volume for the second receptacle 320b may be the volume circumscribed by the receptacle walls and the second piston 324b. Because the perimeter of the second piston 324b is in sliding communication with the receptacle walls of the second receptacle 320b, the variable volume for the second receptacle 320b may be situated below the second piston 324b and the second piston 324b may prohibit fluid 314 from traveling beyond the second piston 324b in an upward direction.

In some embodiments, each of the first piston 324a and the second piston 324b may have a sealing means around the perimeter of each of the first piston 324a and the second piston 324b, respectively, such that the sealing means prohibits fluid 314 from traveling beyond the respective pistons in an upward direction. For example, the sealing means placed around the perimeter of each of the first piston and the second piston may be a rubber ring. The rubber ring may slide along the receptacle walls when a piston is being moved within a receptacle.

The apparatus 300 may include a first piston rod 326a. The first piston rod 326a may be coupled at one end to the first piston 324a. The apparatus 300 may include a second piston rod 326b. The second piston rod 326b may be coupled at one end to the second piston 324b.

The apparatus 300 includes a lever 330 rotatable about a lever pivot 332. The lever 330 may be a single component that pivots about the lever pivot 332 in a "see-saw" fashion. The lever 330 may be coupled, at a first side of the lever pivot 332, to the first piston 324a via the first piston rod 326a. The lever 330 may also be coupled, at a second side of the lever pivot 332, to the second piston 324b via the second piston rod 326b. In some embodiments, the lever 330 may also include a crank (not illustrated in FIG. 3) for translating linear motion of the lever 330 into rotary motion. Although the lever 330 is illustrated as being a single component, in some embodiments, the lever 330 may include multiple components.

As will be apparent from the description of the present application, movement of the first, piston 324a that decreases the variable volume in the first receptacle 320a induces, via the lever 330, a corresponding movement of the second piston 324b which increases the variable volume in the second receptacle 320b. Similarly, movement of the first piston 324a that increases the variable volume in the first receptacle 320a induces, via the lever 330, a corresponding movement of the second piston 324b which decreases the variable volume in the second receptacle 320b.

Referring still to FIG. 3, the first receptacle 320a includes a first drainage conduit 342a and a first suction conduit 314a. The first receptacle 320a may be in fluid communication with the reservoir 310 via the first drainage conduit 342a and the first suction conduit 344a. Similarly, the second receptacle 320b includes a second drainage conduit 342b and a second suction conduit 344b. The second receptacle 320b may be in fluid communication with the reservoir 310 via the second drainage conduit 342b and the second suction conduit 344b. In the example apparatus 300 of FIG. 3 the first drainage conduit 342a and the second drainage conduit 342b are in direct communication with the reservoir 310. For example, in contrast to the apparatus 100 of FIGS. 1 and 2, the apparatus 300 of FIG. 3 does not include a drainage collection conduit.

The apparatus 300 includes a first control valve 352a for the first drainage conduit 342a for controlling the fluid communication between the first receptacle 320a and the reservoir 310. The first control valve 352a may have an open mode for permitting the fluid to drain from the first receptacle 320a to the reservoir 310 via the first drainage conduit 342a. The first control valve 352a may have a closed mode for disallowing the fluid 314 to drain from the first receptacle 320a.

The apparatus 300 includes a second control valve 352b for the second drainage conduit 342b for controlling the fluid communication between the second receptacle 320b and the reservoir 310. The second control valve 352b may have an open mode for permitting the fluid 314 to drain from the second receptacle 320b to the reservoir 310 via the second drainage conduit 342b. The second control valve 352b may have a closed mode for disallowing the fluid 314 to drain from the second receptacle 320b. The first control valve 352a and the second control valve 352b may be any type of valve, such as a butterfly valve, globe valve, needle valve, etc., for isolating or regulating fluid flow through the first drainage conduit 342a and the second drainage conduit 342b.

The apparatus 300 includes a first one-way check valve 354a for the first drainage conduit 342a and a second one-way check valve 354b for the first suction conduit 344a. The first one-way check valve 354a allows the fluid 314 to flow in a direction from the first receptacle 320a to the reservoir 310 via the first drainage conduit 342a, but disallows the fluid 314 to flow in a direction from the reservoir 310 to the first receptacle 320a via the first drainage conduit 342a.

The second one-way check valve 354b allows the fluid 314 to flow in a direction from the reservoir 310 to the first receptacle 320a via the first suction conduit 344a, but disallows the fluid 314 to flow in a direction from the first receptacle 320a to the reservoir 310 via the first suction conduit 344a.

The apparatus 300 also includes as third one-way check valve 354c for the second drainage conduit 342b and a fourth one-way check valve 354d for the second suction conduit 344b. The third one-way check valve 354c allows the fluid 314 to flow in a direction from the second receptacle 320b to the reservoir 310 via the second drainage conduit 342b, but disallows the fluid 314 to flow in a direction from the reservoir 310 to the first receptacle 320a via the second drainage conduit 342b.

The fourth one-way check valve 354d allows the fluid 314 to flow in a direction from the reservoir 310 to the second receptacle 320b via the second suction conduit 344b, but disallows the fluid 314 to flow in a direction from the second receptacle 320b to the reservoir via the second suction conduit 314b.

The apparatus 300 also includes a controller (not illustrated in FIG. 3) coupled to the first control valve 352a and the second control valve 352b. The controller may be configured to alternatingly configure one of the first receptacle 320a and the second receptacle 320b to enable draining to the reservoir 310 while configuring another of the first receptacle 320a and the second receptacle 320b to disallow draining to the reservoir 310. As will be apparent in the description that follows, when the controller configures one of the first receptacle 320a and the second, receptacle 320b to disallow draining to the reservoir 310, that receptacle (e.g., one of the first receptacle 320a and the second receptacle 320b that cannot drain to the reservoir 310) can draw in the fluid 314 from the reservoir 310 based, for example, on suction force generated by piston movement and buoyancy forces acting on pistons.

In some embodiments, the controller may include a pair of cam followers and a pair of cams, as described with reference to FIG. 1 and FIG. 2. In some other embodiments, the controller may include a first fluid sensor affixed in the first receptacle 320a and a second fluid sensor affixed in the second receptacle 320b. The first fluid sensor and the second fluid sensor may be in communication with the first control valve 352a and the second control valve 352b, as described above in an example embodiment. Accordingly, the controller (not illustrated in FIG. 3) is configured such that when the first control valve 352a may be in an open mode, the second control valve 352b may be in a closed mode. Further, when the first control valve 352a may be in a closed mode, the second control valve 352b may be in an open mode. Accordingly, at a discrete point in time, one of the first receptacle 320a and the second receptacle 320b will be draining the fluid 314 into the reservoir 310 (e.g., a control valve in open mode). Further, at that the discrete point in time, another of the first receptacle 320a and the second receptacle 320b will disallow the fluid 314 to drain into the reservoir 310 (e.g., a control valve in closed mode). Accordingly, at a discrete point in time, the fluid 314 within one of the pair of receptacles (e.g., first receptacle 320a or second receptacle 320b) will be draining into the reservoir 310 and the fluid 314 within another of the pair of receptacles (e.g., second receptacle 320b or first receptacle 320a) will not be draining into the reservoir 310.

Referring still to FIG. 3, the reservoir 310 may contain the fluid 314 having a fluid level 316. In some embodiments, the first suction conduit 344a and the second suction conduit 344b may be immersed in the fluid 314 of the reservoir 310. As illustrated in FIG. 3, each of the first suction conduit 344a and the second suction conduit 344b may have a conduit end that is submerged within the fluid 314 of the reservoir 310.

Although the second one-way check valve 354b and the fourth one-way check valve 354d are illustrated in FIG. 3 as being above the fluid level 316, in some embodiments, the second one-way check valve 354b and the fourth one-way check valve 354d may be positioned below the fluid level 316.

In some embodiments, the first drainage conduit 342a and the second drainage conduit 342b may not be immersed in the fluid of the reservoir 310. That is, each of the first drainage conduit 342a and the second drainage conduit 342b may have a conduit end that is not submerged within the fluid 314 of the reservoir 310. For example, when fluid 314 drains from each of the first receptacle 320a and the second receptacle 320b, the fluid 314 exiting from each of the first drainage conduit 342a and the second drainage conduit 342b may pass through the environment or air before entering the reservoir 310.

Figure 4B:
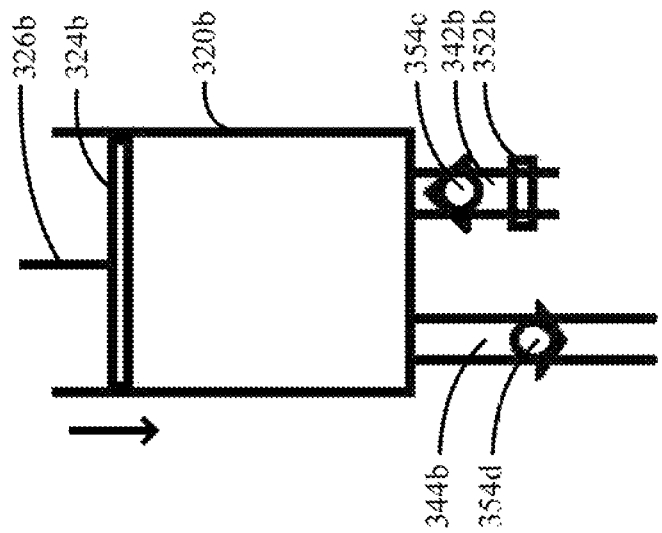
FIG. 4B is a side elevation plan view of a second receptacle of FIG. 3.
Figure 4A:
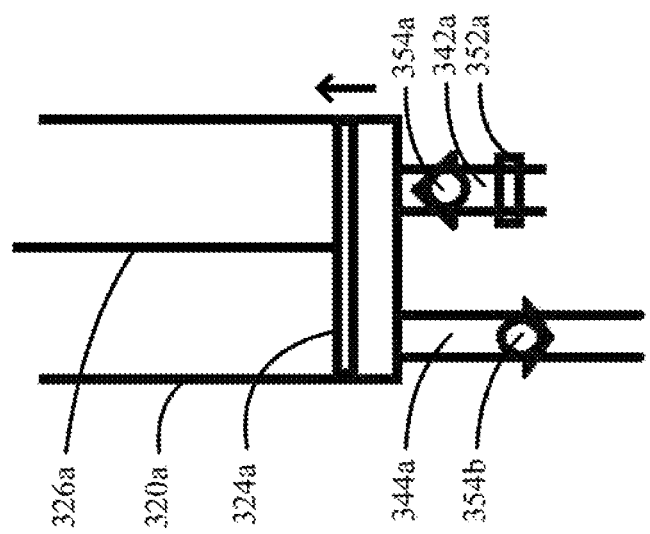
FIG. 4A is a side elevation plan view of as first receptacle of FIG. 3.

Reference is now made to FIG. 4A, which is a side elevation plan view of the first receptacle 320a of FIG. 3. In FIG. 4A, when the lever 330 (not illustrated in FIG. 4A), via the first piston rod 326a, causes the first piston 324a to move in an upwards direction and away from the reservoir 310 (not illustrated in FIG. 4A), the variable volume within the first receptacle 320a may increase. Further, when the lever 330 causes the first piston 324a to move in an upwards direction, the controller may configure the first control valve 352a to be in a closed mode.

In an example, the lever 330 (not illustrated in FIG. 4A) may be moving in a direction that may exert a force on the first piston 324a that is greater than gravitational force on the first piston 324a. Accordingly, the lever 330 may cause the first piston 324a to move in an upward direction within the first receptacle 320a. As the first piston 324a moves in an upward direction within the first receptacle 320a, the variable volume within the first receptacle 320a may increase.

In some embodiments, the first piston 324a may have a sealing means around the perimeter of the first piston 324a, such that fluid contained within the first receptacle 320a may not travel in an upwards direction above a position of the first piston 324a. Accordingly, when the controller configures the first control valve 352a to be in a closed mode and when the first piston 324a may be moving in an upward direction, a suction force may cause fluid 314 to be drawn into the first receptacle 320a via the first suction conduit 344a.

As fluid 314 may be drawn into the first receptacle 320a, the fluid within the first receptacle 320a may fill the variable volume. As the fluid 314 fills the first receptacle 320a, buoyancy force from the fluid 314 may act on the first piston 324a in an upward direction.

Accordingly, force front the lever 330, via the first piston rod 326a, and buoyancy force from the fluid 314 contained within the first receptacle 320a may each contribute to causing the first piston 324a movement in an upward direction within the first receptacle 320a. Because the first one-way check valve 354a for the first drainage conduit 342a disallows the fluid 314 to flow via the first drainage conduit 342a in a direction from the reservoir 310 to the first receptacle 320a, suction force may cause the fluid 314 to be drawn into the first receptacle 320a through the first suction conduit 344a (rather than the first drainage conduit 342a).

Reference is now made to FIG. 4B, which is a side elevation plan view of the second receptacle 320b of FIG. 3. In FIG. 4B, when the lever 330 (not illustrated in FIG. 4B), via the second piston rod 326b, causes the second piston 324b to move in a downward direction and towards the reservoir 310 (not illustrated in FIG. 4B), the variable volume within the second receptacle 320b may decrease. Further, when the lever 330 causes the second piston 324b to move in a downwards direction, the controller may configure the second control valve 352b to be in an open mode.

In the apparatus 300 of FIG. 3, when the lever 330 causes the first piston 324a to move in an upwards direction and away front the reservoir 310, the lever 330 correspondingly causes the second piston 324b to move in a downwards direction and towards the reservoir 310. Accordingly, the movement of the first piston 324a in an upward direction (FIG. 4A) may simultaneously correspond to movement of the second piston 324b in a downward direction (FIG. 4B).

For example, the lever 330 (not illustrated in FIG. 4B) may be moving in a direction that may exert a downward force on the second piston 324b via the second piston rod 326b. Further, gravitational force acting on the second piston 324b may cause the second piston 324b to move in a downward direction within the second receptacle 320b. Overall, in FIG. 4B, the second piston 324b may experience a net downwards force and may move in a downward direction within the second receptacle 320b.

In some embodiments, the second piston 324b may have a sealing means around the perimeter of the second piston 324b, such that fluid contained within the second receptacle 320b may not travel in an upwards direction above a position of the second piston 324b.

Because the variable volume within the second receptacle 320b decreases when the second piston 324b moves in a downward direction and because the fluid 314 may be a non-compressible or incompressible fluid, the fluid 314 may be urged through the second drainage conduit 342b. Specifically, the fluid 314 may be urged to exit the second receptacle 320b through the second drainage conduit 342b and pass through the third one-way check valve 354c and the second control valve 352b. Because the fourth one-way check valve 354d disallows the fluid 314 from flowing from the second receptacle 320b to the reservoir 310 via the second suction conduit 344b, the fluid 314 may drain through the second drainage conduit 342b (rather than the second suction conduit 344b).

Accordingly, force on the second piston 324b from the lever 330, via the second piston rod 326b, and gravitational force on the second piston 324b may each contribute to causing the second piston 323b movement in a downward direction within the second receptacle 320b. Further, because the second piston 324b may have a sealing means around the perimeter of the second piston 324b, gravitational force acting on fluid may cause the fluid to drain from the second receptacle 320b into the reservoir 310 and cause the variable volume to decrease. To decrease the variable volume, the second piston 324b may also be urged to move in a downward direction within the second receptacle 320b by virtue of draining fluid from the second receptacle 320b into the reservoir 310.

Overall, force from the lever 330, via the second piston rod 326, and gravitational force on the fluid contained within the second receptacle 320b may each contribute to causing fluid contained within the second receptacle 320b to be urged from the second receptacle 320b into the reservoir 310 via the second drainage conduit 342b.

Further, a downward force on the second piston 324b by virtue of draining fluid from the second receptacle 320b into the reservoir 310 may cause, via the lever 330, a corresponding upward force on the first piston 324a (FIG. 4A).

Based at least on the description of the first receptacle 320a in FIG. 4A and the second receptacle 320b in FIG. 4B, flow of fluid 314 into or out stile first receptacle 320a or the second receptacle 320b may be determined by: (1) state of the first control valve 352a and the second control valve 352b; and (2) direction that the first piston 324a or the second piston 324b may be moving within the first receptacle 320a or the second receptacle 320b, respectively.

Further, because the respective pistons may be in sliding communication with receptacle walls, a change in a variable volume is related to a change in a piston position and vice versa. Accordingly, when a piston moves within a receptacle in an upward direction to increase a variable volume, a suction force for drawing fluids into a receptacle is created. Conversely, when fluid is drained from a receptacle to decrease a variable volume, a piston may be urged to move within a receptacle in a downward direction to decrease the variable volume.

Figure 5A:
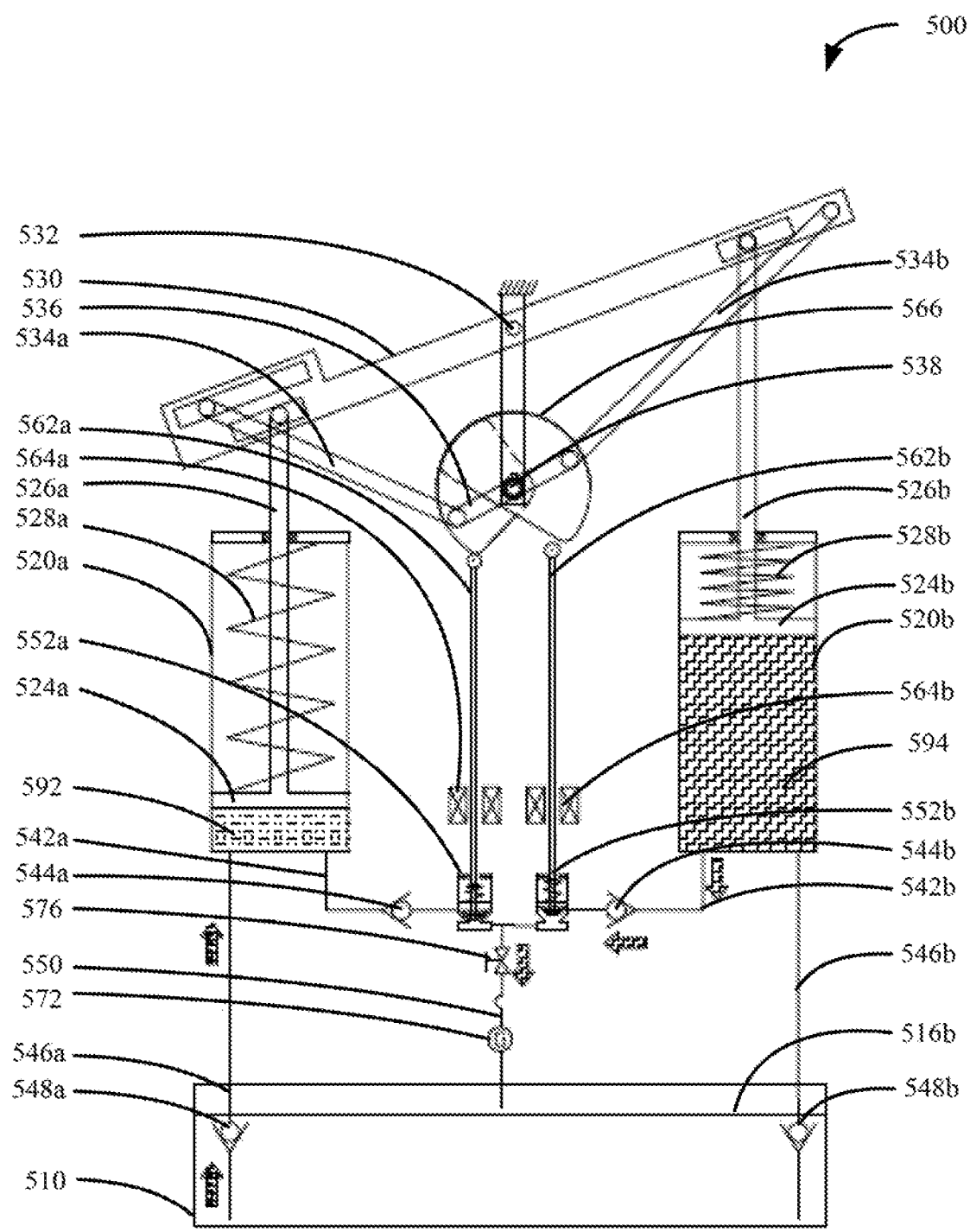

Reference is now made to FIGS. 5A, 5B, and 5C, which are side elevation views of an apparatus 500 for generating energy in accordance with an embodiment of the present application. As will become apparent from the description that follows, each of FIGS. 5A, 5B, and 5C illustrate the apparatus 500 in operation and illustrated at different points in time. Reference numerals are provided for features of the apparatus in FIG. 5A. The reference numerals in FIG. 5A are also applicable to similarly illustrated features of the apparatus 500 illustrated in FIGS. 5B and 5C.

Similar to the apparatus described in FIGS. 1, 2, and 3, the apparatus 500 in FIGS. 5A, 5B, and 5C includes a first receptacle 520a and a second receptacle 520b in communication with a reservoir 510. The first receptacle 520a and the second receptacle 520b are mounted above the reservoir 510. The first receptacle 520a and the second receptacle 520b have a variable volume for holding fluid. The apparatus 500 so include a first piston 524a moveable within the first receptacle 520a and a second piston 524b movable within the second receptacle 520b.

For ease of exposition, in FIG. 5A, fluid contained within the first receptacle 520a may be labeled as suction fluid 592. The suction fluid 592 may be distinguished from fluid contained within the second receptacle 520b, which may be labeled as drainage fluid 594. In FIG. 5A, the suction fluid 592 may be circumscribed by the first piston 524a and receptacle walls of the first receptacle 520a. Further, in FIG. 5A, the drainage fluid 594 may be circumscribed by the second, piston 524b and receptacle walls of the second receptacle 520b.

The apparatus 500 may also include a lever 530 rotatable about a lever pivot 532. The lever 530 may be coupled, at a first side of the lever pivot 532, to the first piston 524a via the first piston rod 526a. The lever 530 may also be coupled at a second side of the lever pivot 532, to the second piston 524b via the second piston rod 526b. According, movement of the first piston 524a that decreases the variable volume in the first receptacle 520a induces, via the lever 530, a corresponding movement of the second piston 524b, which increases the variable volume in the second receptacle 520b.

The apparatus 500 may also include a crank 536 coupled to the lever 530 via a first crank arm 534a and a second crank arm 534b (FIG. 5). The crank 536 is rotatable about a crank pivot 538. Accordingly, when the lever 530 moves in a "see-saw" type fashion about the lever pivot 532, the first crank arm 134a and the second crank arm 134b couples the lever 130 to the crank 136 and generates rotational movement of the crank 536 about the crank pivot 538.

The apparatus 500 in FIG. 5A may also include a first control valve 552a and a second control valve 552b for controlling the fluid communication between the first receptacle 520a or the second receptacle 520b and the reservoir 510.

The apparatus 500 illustrated in FIG. 5A may include a controller including a pair of cam followers and a pair of cams 566 configured to alternatingly configure one of the pair of receptacles to enable draining to the reservoir while configuring another of the pair of receptacles to prevent draining to the reservoir but to allow suction from the reservoir.

The apparatus 500 illustrated in FIG. 5A may also include a first drainage conduit 542a and a first suction conduit 546a. The first drainage conduit 542a may include a first one-way check valve 544a for fluid to flow in a direction from the first receptacle 520a to the reservoir 510, but disallowing fluid flow in the opposite direction. The first suction conduit 546a may include a second one-way check valve 548a for allowing fluid contained in the reservoir 510 to flow in a direction from the reservoir 510 to the first receptacle 520a, but disallowing fluid flow in the opposite direction.

The apparatus 500 may also include a second drainage conduit 542b and a second suction conduit 546b. The second drainage conduit 542b may include a third one-way check valve 544b for allowing fluid to flow in a direction from the second receptacle 520b to the reservoir 510, but disallowing fluid flow in the opposite direction. The second suction conduit 546b may include a fourth one-way check valve 548b for allowing fluid contained in the reservoir 510 to flow in a direction from the reservoir 510 to the second receptacle 520b, but disallowing fluid flow in the opposite direction.

The apparatus 500 may also include a drainage collection conduit 550 for merging the first drainage conduit 542a and the second drainage conduit 542b. Although the apparatus 500 in FIG. 5A illustrates a drainage collection conduit 550 for merging the first drainage conduit 542a and the second drainage conduit 542b, in other embodiment, the first drainage conduit 542a may guide fluid to the reservoir 510 and the second drainage conduit 542b may guide fluid to the reservoir 510 without the drainage collection conduit 550.

The apparatus 500 also includes a hydroelectric generator 572 coupled at the drainage collection conduit 550 for generating electrical energy. For example, the hydroelectric generator 572 may include an impeller. When fluid is drained from either the first receptacle 520a or the second receptacle 520b, the fluid may rotate the impeller and the hydroelectric generator 572 may generate electrical energy based on the impeller rotation.

In some other embodiments, a generator may be coupled to the crank pivot 538 to translate rotational movement of the pair of cams 566 and/or the crank 536 into electrical energy.

In some embodiments, the apparatus 500 in FIG. 5 may include a first spring 528a land a second spring 528b. The first spring 528a and the second spring 528b may store kinetic energy, when compressed, to aid in decreasing the variable volume in the first receptacle 520a and the second receptacle 520b, respectively. Accordingly, when the first piston 524a and the second piston 524b are being biased in a downward direction in the respective receptacles, the stored kinetic energy in the first spring 528a or the second spring 528b may provide to compression force to aid in decreasing the variable volume in the respective receptacle.

Referring to FIG. 5A, the apparatus 500 is illustrated at a first point in time. Just prior to the first point in time, the first piston 524a may have been moving within the first receptacle 520a and moving in a direction away from the reservoir 510 (e.g., in an upward direction). Similarly, just prior to the first point in time, the second piston 524b may have been moving within the second receptacle 520b and moving in a direction towards the reservoir 510 (e.g., ward direction).

Further, at the first point in time illustrated in FIG. 5A, the pair of cams 566 are illustrated as configuring a first cam follower 562a at a first distance to configure the first control valve 552a to prevent fluid from draining from the first receptacle 520a. The pair of cams 566 are also illustrated as configuring a second cam follower 562b at a second distance to configure the second control valve 552b to allow fluid to drain from the second receptacle 520b to the reservoir 510. Accordingly, the suction fluid 592 represents fluid drawn into the first receptacle 520a. The suction fluid 592 may be drawn in by a suction force generated when the first piston 524a moves in an upward direction within the first receptacle 520a. As previously described, the first piston 524a may also be urged in an upward direction by the lever 330 and/or by buoyancy forces from the suction fluid 592 acting on the first piston 524a.

Further, the drainage fluid 594 represents fluid in the second receptacle 520b that may be drained to the reservoir 510 through the second drainage conduit 542b. That is, at the first point in time illustrated in FIG. 5A, the second control valve 552b is configured in an open mode and the drainage fluid 594 contained within the second receptacle 520b may flow from the second receptacle 520b into the reservoir 510.

As previously described, the second piston 524b may be urged in a downward direction by gravitational forces on the second piston 524b and by a force of the lever 530, via the second piston rod 526b, on the second piston 524b. Because the drainage fluid 594 may be a non-compressible or incompressible fluid, the drainage fluid 594 may be urged through the second drainage conduit 342b by the second piston 524b. The drainage fluid 594 may also drain through the second control valve 552b in an open mode based, in part, on gravitational forces.

Accordingly, in FIG. 5A, because the first control valve 552a is in a closed mode and the second control valve 552b is in an open mode, the drainage collection conduit 550 receives drainage fluid 594 from the second receptacle 520b, but does not receive any of the suction fluid 592 contained within the first receptacle 520a.

Reference is now made to FIG. 5B, which illustrates the apparatus 500 in FIG. 5A at a second point in time. The second point in time (e.g., illustrated in FIG. 5B) may be a subsequent point in time after the first point in time (e.g., illustrated in FIG. 5A). Compared to the state of the apparatus 500 in FIG. 5A, in FIG. 5B, the first piston 524a may have moved to a second position that is further away upward direction) from the reservoir 510 than the position of the first piston 424a in FIG. 5A. Similarly, the second piston 524b may have moved to a second position that is nearer (e.g., downward direction) to the reservoir 510 than the position of the second piston 424b in FIG. 5B. In FIG. 5B, the pair of cams 566 may continue to configure the first control valve 552a to be in a closed mode and to configure the second control valve 552b to be in an open mode. Accordingly, fluid may be drawn into the first receptacle 520a and the first receptacle 520a may contain the suction fluid 592. Similarly, the drainage fluid 594 may continue to be drained from the second receptacle 520b into the reservoir 510.

Reference is now made to FIG. 5C, which illustrates the apparatus 500 in FIG. 5A at a third point in time. The third point in time (e.g., illustrated in FIG. 5C) may be a subsequent point in time after both the first point in time (e.g., illustrated in FIG. 5A) and the second point in time (e.g., illustrated in FIG. 5B). In contrast to FIG. 5A and FIG. 5B, in FIG. 5C, the pair of cams 566 may now configure the first control valve 552a to be in an open mode and the second control valve 552b to be in a closed mode.

For example, in FIG. 5A, the pair of cams 566 were illustrated as configuring the first cam follower 562a at a first distance and the second cam follower 562b at a second distance. In FIG. 5C, however, the pair of cams 566 may have rotated past a transition point such that the pair of cams 566 are illustrated as configuring the first cam follower 562a at a second distance to configure the first control valve 552a to allow fluid to drain from the first receptacle 520a to the reservoir 510. Further, in FIG. 5C, the pair of cams 566 is illustrated as configuring the second cam follower 562b at a first distance to configure the second control valve 552b to block or prevent fluid from draining from the second receptacle 520b.

For ease of exposition, in FIG. 5C, because the first control valve 552a may be configured in an open mode, at the third point in time, the fluid contained within the first receptacle 520a may be labeled as transitioned drainage fluid 596. The transition drainage fluid 596 may be distinguished from fluid contained within the second receptacle 520b, which may be labeled as transition suction fluid 598. That is, the transition drainage fluid 596 is fluid that was drawn into the first receptacle 520a at a previous point in time (see e.g., FIGS. 5A and 5B). The transition Suction fluid 598 may be fluid that remained in the second receptacle 520b when the second control valve 552b switched from an open mode to a closed mode. Alternatively, the transition suction fluid 598 may be fluid that has already been drawn into the second receptacle 520b from the reservoir 510.

In FIG. 5C, when the first control valve 552a is in an open mode, the transitioned drainage fluid 596 may be urged to drain from the first receptacle 520a by at least, gravitational forces acting on the transitioned drainage fluid 596. As described, the first piston 524a may have a seal around the piston perimeter. Accordingly, as transitioned drainage fluid 596 flows from the first receptacle 520a to the reservoir 510 via the first drainage conduit 542a and the drainage collection conduit 550, the variable volume within the first receptacle 520a may decrease and the first piston 524a may be urged in a downward direction (e.g., towards the reservoir 510) as the transitioned drainage fluid 596 exits the first receptacle 520a.

As the second piston 524b is coupled to the first piston 524a via the lever 530, the second piston 524b may correspondingly be urged in an upward direction (e.g., away from the reservoir 510). The upward moving second piston 524b may cause a suction force to draw fluid from the reservoir 510 into the second receptacle 520b (e.g., transitioned suction fluid 598). Further, the second piston 524b may be urged in an upward direction, at least in part, by movement of the lever 530 about the lever pivot 532 and buoyancy forces from the transitioned suction fluid 598 acting on the second piston 524b.

Overall, when the first control valve 552a is configured in a closed mode, the fluid contained in the first receptacle 520a may be labeled as suction fluid 592 (see e.g., FIG. 5A). When the first control valve 552a is configured in an open mode, the fluid contained in the first receptacle 520a may be labeled as transitioned drainage fluid 596 (see e.g., FIG. 5C).

Further, when the second control valve 552b is configured in an open mode, the fluid contained in the second receptacle 520b may be labeled as drainage fluid 594 (see e.g., FIG. 5A). When the second control valve 552b is configured in a closed mode, the fluid contained in the second receptacle 520b may be labeled as transitioned suction fluid 598. Accordingly, the fluid contained within a respective receptacle may be fluid that has been drawn into the respective receptacle if a control valve associated with the respective receptacle is in a closed mode. Correspondingly, the fluid contained within a respective receptacle may be fluid that is to be drained from the respective receptacle if a control valve associated with the respective receptacle is in an open mode.

As will be apparent from the foregoing description of FIGS. 5A, 5B, and 5C, the pair of cams 566 may rotate and may alternately configure the first control valve 552a and the second control valve 552b to switch from an open mode to a closed mode, and vice versa, such that the first receptacle 520a and the second receptacle 520b may alternately draw in fluid from the reservoir 510 and drain fluid to the reservoir 510. The cyclic transitions of drawing in fluid and draining fluid in the respective receptacles may cause: (1) movement of the lever in a "see-saw" fashion; (2) rotation of the crank 536 and/or the pair of cams 566; and (3) movement of fluid, such that generators may be coupled to the apparatus 500 of FIGS. 5A, 5B, and 5C for generating energy.

Figure 6C:
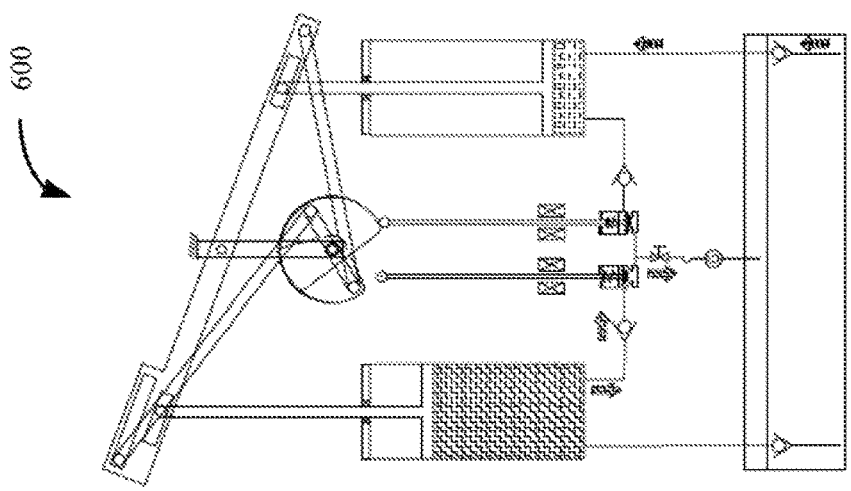
FIGS. 6A, 6B, and 6C are side elevation plan views of another apparatus illustrated at three different points in time, respectively, during operation in accordance with an embodiment of the present application.
Figure 6B:
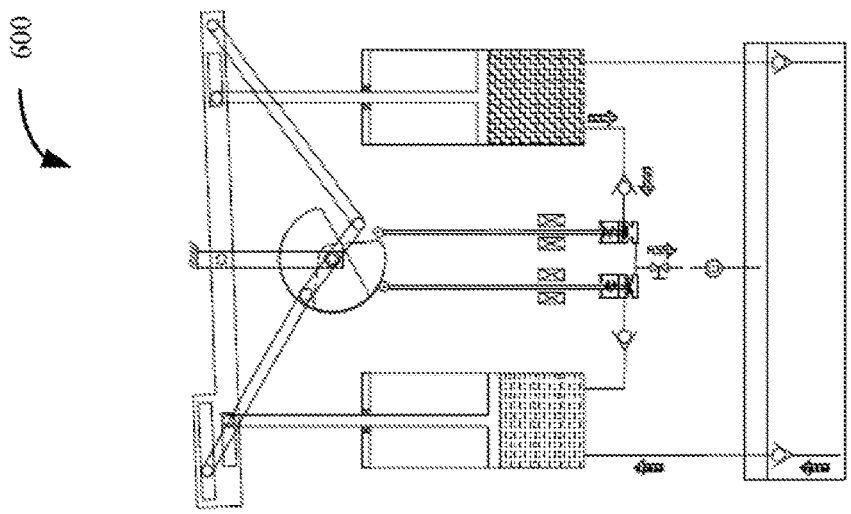
Figure 6A:
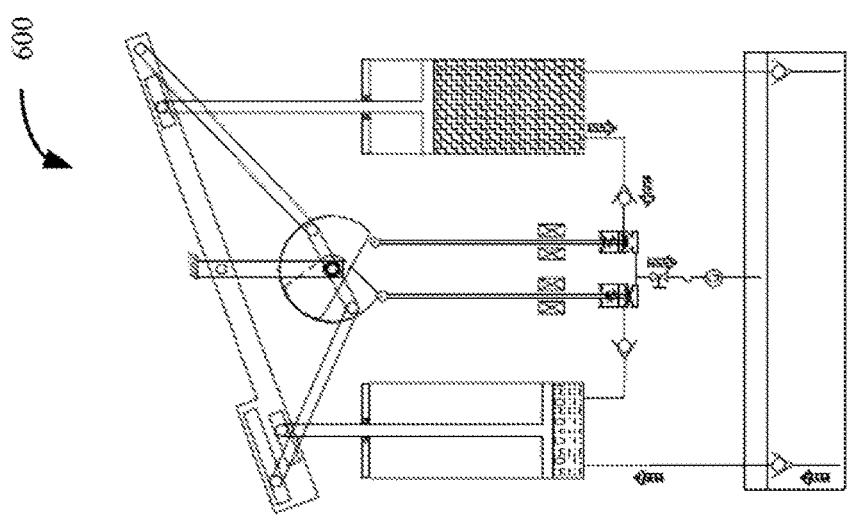

Reference is now made to FIGS. 6A, 6B, and 6C, which are side elevation plan views of an apparatus 600 for generating energy in accordance with an example embodiment of the present application. FIGS. 6A, 6B, and 6C correspond to FIGS. 5A, 5B, and 5C, respectively; however, the apparatus 600 of FIGS. 6A, 6B, and 6C do include springs within the respective receptacles and/or adjacent the piston and/or piston rods.

Figure 7C:
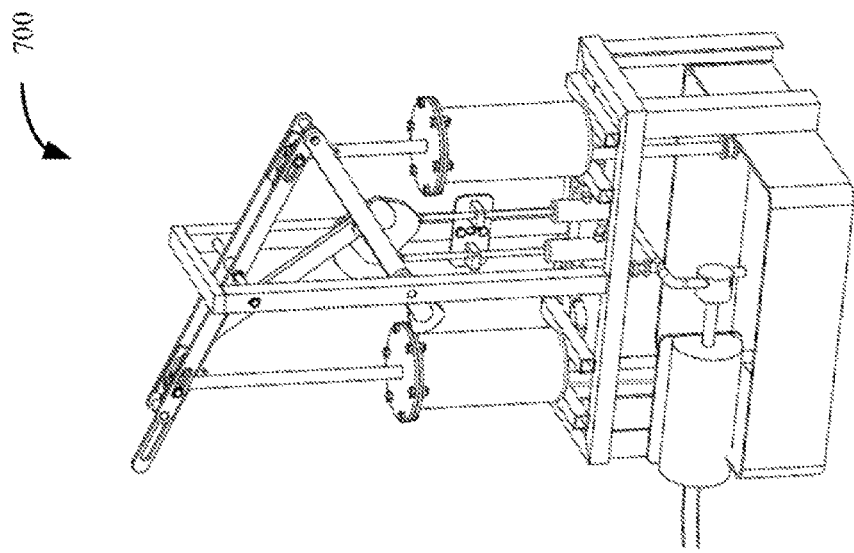
FIGS. 7A, 7B, and 7C are perspective views of the apparatus of FIGS. 5A, 5B, and 5C, respectively.
Figure 7B:
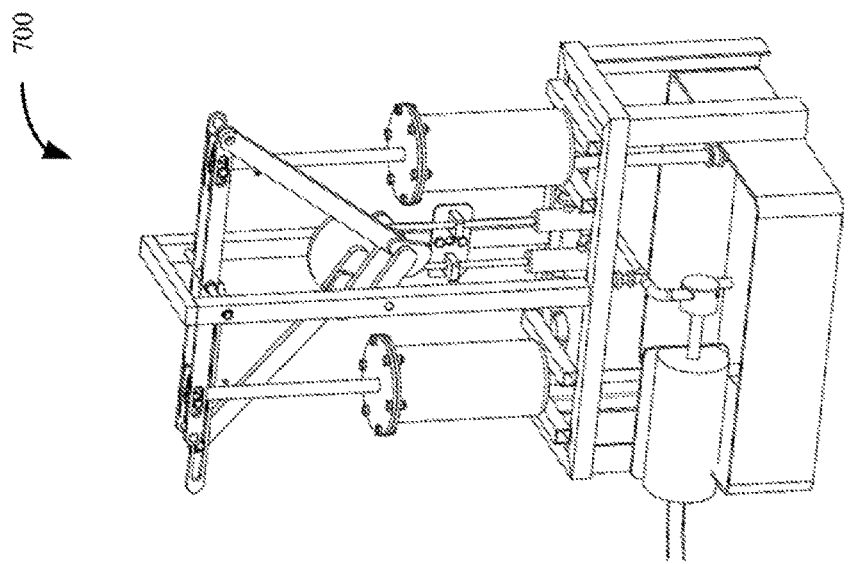
Figure 7A:
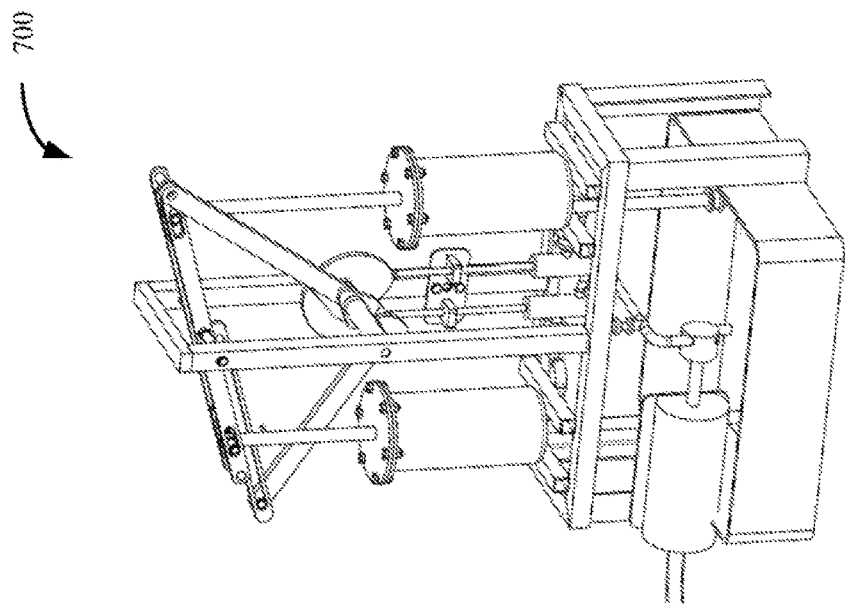

Reference is now made to FIGS. 7A, 7B, and 7C, which are perspective views of the apparatus 500 of FIGS. 5A, 5B, and 5C, respectively. Similar to the description to FIGS. 5A, 5B, and 5C, FIGS. 7A, 7B, and 7C illustrate the apparatus 500 in operation and illustrated at different points in time.

Specifically, FIG. 7A illustrates the apparatus 500 at a first point in time when the first control valve 552a may be configured in a closed mode and the second control valve 552b may be configured M an open mode. Accordingly, fluid may be drawn into the first receptacle 520a from the reservoir 510, while fluid may be drained from the second receptacle 520b to the reservoir 510.

FIG. 7B illustrates the apparatus 500 at a second point in time, where the first control valve 552a and the second control valve 552b may be configured as in FIG. 7A, but where the first piston 524a and the second piston 524b may have moved to a different position as compared to FIG. 7A.

FIG. 7C illustrates the apparatus 500 at a third point in time, where the first control valve 552a may be in an open mode and the second control valve 552b may be in a closed mode. Accordingly, fluid may be drained from the first receptacle 520a to the reservoir 510 and fluid may be drawn into the second receptacle 520b from the reservoir 510.

Figure 8C:
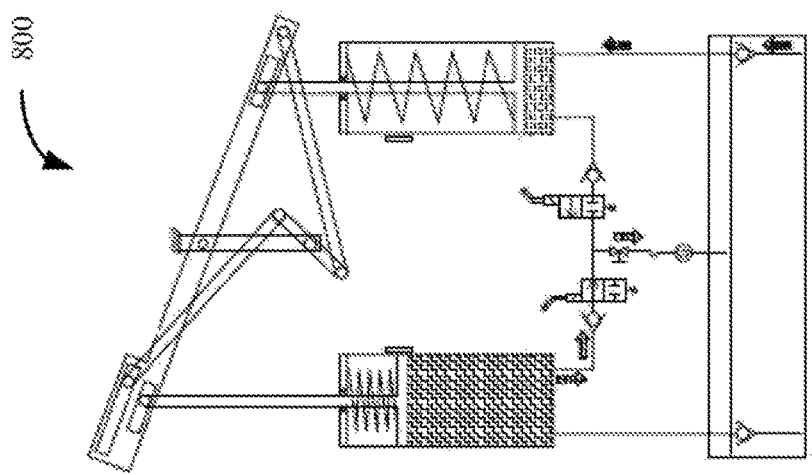
FIGS. 8A, 8B, and 8C are side elevation plan views of an apparatus illustrated at three different points in time, respectively, during operation in accordance with an embodiment of the present application.
Figure 8B:
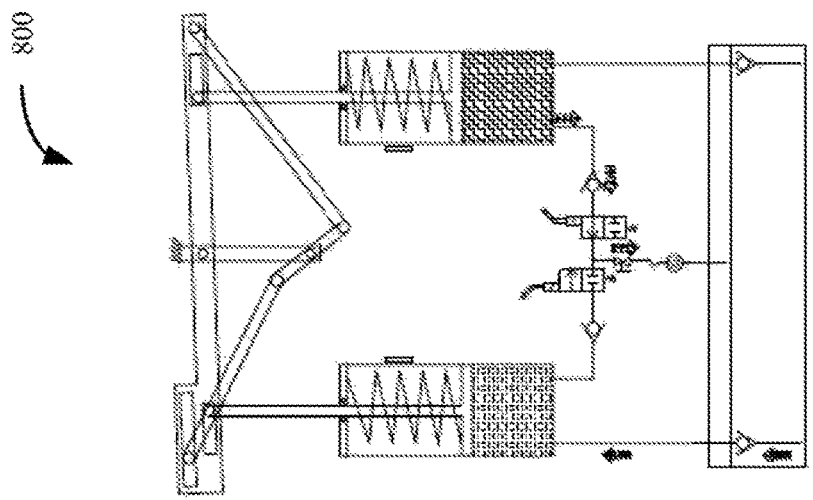
Figure 8A:
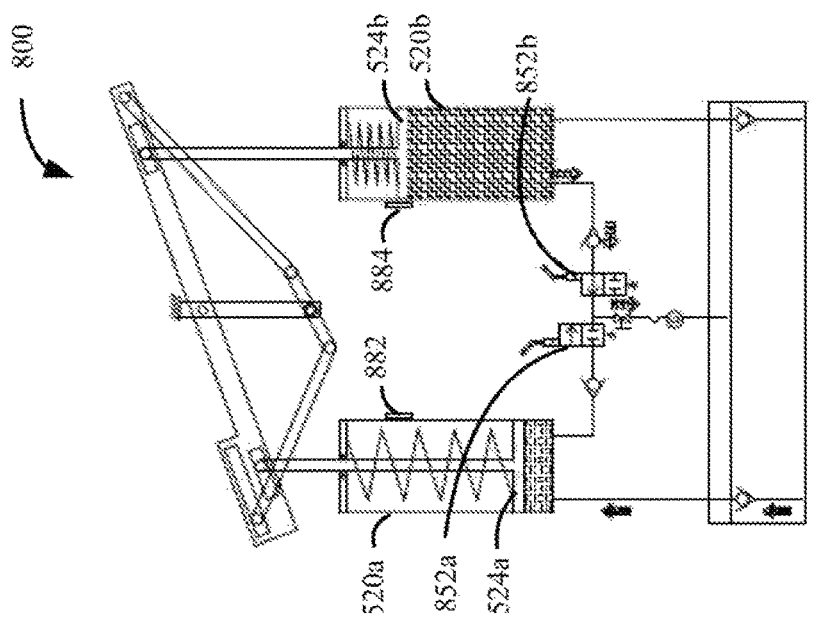

Reference is now made to FIGS. 8A, 8B, and 8C, which are side elevation plan views of an apparatus 800 for generating energy in accordance with another embodiment of the present application. FIGS. 8A, 8B, and 8C illustrate the apparatus 800 in operation and illustrated at different points in time. FIGS. 8A, 8B, and 8C correspond to FIGS. 5A, 5B, and 5C, respectively; however, the pair of cam followers and the pair of cams 566 have been replaced with a first fluid level sensor 882 and a second fluid level sensor 884. The first fluid level sensor 882 and the second fluid level sensor 884 may be affixed to or positioned on a receptacle wall of the first receptacle 520a and the second receptacle 520b, respectively.

The first fluid level sensor 882 may be in communication with a first control valve 852a and a second control valve 852b, via a wireless connection. Similarly, the second fluid level sensor 884 may be in communication with the first control valve 852a and the second control valve 852b, via a wireless connection. One of the first control valve 852a and the second control valve 852b may be in a closed mode, while the other of the first control valve 852a and the second control valve 852b may be in an open mode. Although the first fluid level sensor 882 and the second fluid level sensor 884 may be in wireless communication with the first control valve 852a and the second control valve 852b, respectively, in some other embodiments, the communication may be via a wired connection.

In some embodiments, the first fluid level sensor 882 and the second fluid level sensor 884 may be positioned on the walls of the pair of receptacles for detecting whether a fluid containing capacity for a receptacle has been reached. For example, the first fluid level sensor 882 and the second fluid level sensor 888 may be positioned on receptacle walls to indicate when the volume of fluid drawn into a receptacle reaches 90% of the maximum fluid containing capacity of the receptacle (e.g., fluid volume threshold).

In some embodiments, when one of the first fluid level sensor 882 and the second fluid level sensor 884 detects that a fluid volume threshold has been reached, the first control valve 852a may be configured to switch from a closed mode to an open mode and the second control valve 852b may be configured to switch from an open mode to a closed mode, or vice versa. Thus, the fluid volume threshold may be setup to define at what point each of the pair of receptacles may switch from drawing in fluids to draining fluids, or vice versa.

Accordingly, in some embodiments, the apparatus 800 of FIGS. 8A, 8B, and 8C may comprise a controller including a pair of fluid level sensors affixed to receptacle walls. The pair of fluid level sensors may be in communication with the control valves. Each of the pair of fluid level sensors may be configured to detect a fluid volume increasing beyond a first threshold in a respective receptacle of the pair of receptacles. When one of the pair of fluid level sensors detects the fluid volume increasing beyond the first threshold in the respective receptacle of the pair of receptacles, the one of the pair of fluid sensors may transmit a switch signal to the control valves to switch from enabling passage of the fluid to preventing drainage of the fluid in one of the control valves, while switching from preventing drainage of the fluid to enabling passage of the fluid in another of the control valves.

In some other embodiments, the first fluid level sensor 882 and the second fluid level sensor 884 may be piston position sensors. For example, piston position sensors may be affixed to walls of the receptacles to determine when a piston moving within the receptacle has moved past the piston position sensor from a lower position (or first position) to a higher position (or second position). The piston position sensors may be positioned at the same positions of the first fluid level sensor 882 and the second fluid level sensor 884 that is described above, or at any other position for defining at what point each of the pair of receptacles may switch from drawing in fluids to draining fluids, or vice versa. Overall, the piston position sensors may be setup to define at what point each of the pair of receptacles may switch from drawing in fluids to draining fluids, or vice versa. For example, the piston position sensors may be a proxy for determining the fluid level or volume of fluid within the first receptacle 520a and the second receptacle 520b.

Reference is now made to FIG. 9A, which is a side elevation view of an apparatus 900 for generating energy in accordance with another embodiment of the present application. The apparatus 900 of FIG. 9 is similar to the apparatus 100 of FIG. 1 and further includes a winding mechanism for initializing movement of a lever 930.

When the apparatus 900 is in an initial or resting state, a first piston 924a (not illustrated in FIG. 9) configured within a first receptacle 920a and a second piston 924b (not illustrated in FIG. 9) configured within a second receptacle 920b may not be moving within the respective receptacles. Accordingly, when the apparatus 900 is in an initial or resting state, fluid may not be drawn into the first receptacle 920a or the second receptacle 920b and/or fluid may not be drained from the first receptacle 920a or the second receptacle 920b to the reservoir 910. When the apparatus 900 is in an initial or resting state, energy may not be generated by any generator 972 coupled to the apparatus 900.

In some embodiments, the apparatus 900 may be initialized by a winding mechanism coupled to a lever 930 for initializing movement of the lever 930. The winding mechanism may include a ratchet 902 and a pawl 904. The pawl 904 may be coupled to the ratchet 902 for regulating the direction of rotation of the ratchet 902.

The apparatus 900 may include a connecting arm 906 for coupling the ratchet 902 to the lever 930. In some embodiments, the connecting arm 906 may couple the ratchet 902 to a first end of the lever 930.

The connecting arm 906 may be configured to translate rotational movement of the ratchet 902 to linear motion in the lever 930. For example, rotational movement of the ratchet 902 may cause the lever 930 to move in a "see-saw" fashion about a lever pivot 932. Similar to example embodiments in the foregoing description, the lever 930 may be rotatable about the lever pivot 932. The lever 930 may be coupled, at a first side of the lever pivot 932, to the first piston 924a (not illustrated FIGS. 9A and 9B) associated with the first receptacle 920a and coupled, at a second side of the lever pivot 932, to the second piston 924b (not illustrated in FIGS. 9A and 9B) associated with the second receptacle 920b. Accordingly, movement of the first piston 924a that decreases a variable volume in the first receptacle 920a induces, via the lever 930, a corresponding movement of the second piston 924b which increases a variable volume in the second receptacle 920b.

In some embodiments, a pedal 908 may be coupled to the ratchet 902 and pawl 904 for generating rotational movement in the ratchet 902. The pedal 908 may be actuated by a user for causing the ratchet 902 to begin rotating. The rotational movement in the ratchet 902 may be coupled to the lever 930. Movement of the lever 930 in the "see saw" fashion about the lever pivot 932 may cause movement of the first piston 924a within the first receptacle 920a and movement of the second piston 924b within the second receptacle 920b.

Once movement of the pistons within respective receptacles begins, a pair of cams 966 configure, via cam followers, control valves to alternatingly allow one of the pair of receptacles to drain fluid into the reservoir 910 while configuring another of the pair of receptacles to prevent draining of fluid into the reservoir 910, but to allow suction of fluid from the reservoir 910.

Although, a ratchet 902, a pawl 904, and a pedal 908 are illustrated for initializing movement for the apparatus 900, other types of winding mechanisms may be implemented to initialize movement for the apparatus 900. In some examples, the apparatus 900 may include an external energy source (not illustrated in FIG. 9). That is, instead of the utilizing the ratchet 902, the pawl 904, and the pedal 908 illustrated in FIG. 9, the external energy source may include an external actuator for initializing movement of the apparatus 900. The external actuator may be coupled to the lever 930 for imparting movement of the lever 930 in the "see-saw" fashion about the lever pivot 932. Such movement of the lever 930 in the "see-saw" fashion about the lever pivot 932 may cause movement of the first piston within the first receptacle 920a and movement of the second piston within the second receptacle 920b.

In some examples, the above described external actuator may periodically impart movement of the lever 930 in the "see-saw" fashion about the lever pivot 932 for ensuring that the lever 930 continues movement in the "see-saw" fashion. For example, the external actuator may be configured to determine whether the rate of movement of the lever 930 about the lever pivot 932 decreases below a predetermined threshold and, if so, impart movement of the lever 930 to maintain movement of the lever 930 about the lever pivot 932.

In some examples, a battery or other electrical source may power the external actuator for maintaining movement of the lever 930 in the "see-saw" fashion. The battery or other electrical source may be a rechargeable by energy generated by the apparatus 900, and the external actuator may require electrical power from the battery when the external actuator imparts movement to the lever 930. The external actuator may be configured to impart movement to the lever periodically or when the rate of movement of the lever decreases below a predetermined threshold.

In some other examples, the battery or the other electrical source may provide electrical power to control valves for controlling fluid suction and drainage in the pair of receptacles. The battery may be rechargeable by energy generated by the apparatus 900. As the energy required for charging the battery may be less than cumulative energy generated by the apparatus 900, the apparatus 900 may produce more electrical energy than it may consume.

Reference is now made to FIG. 9B, which is another side elevation view of the apparatus 900 of FIG. 9 for generating energy.

When the winding mechanism has initialized rotational movement in the ratchet 902 for causing movement in the lever 930, the connecting arm 906 may be disengaged from the lever 930 (FIG. 9B). Once the connecting arm 906 is disengaged from the level 930, a controller of the apparatus 900 may alternatingly configure one of the pair of receptacles to enable draining to the reservoir 910 while configuring another of the pair of receptacles to prevent draining to the reservoir but to allow suction from the reservoir.

Based on the foregoing description, when the controller alternatingly enables draining in one receptacle and prevents draining in another receptacle (but allows suction in that receptacle), the pistons may alternately move upwards and downwards within the respective receptacles based on: (1) gravitational forces acting on pistons and fluid (e.g., draining fluid from receptacle to reservoir); (2) forces on pistons based on movement of a lever; and (3) buoyancy forces acting on pistons. Accordingly, fluid may be drained from a receptacle to a reservoir based on gravitational forces acting on the fluid and based on movement of pistons in a downward direction towards the reservoir. Further, fluid may be drawn into a receptacle from a reservoir based on suction forces generated by pistons moving upwards within a receptacle (e.g., in a direction away from the reservoir). Alternating and opposing movement of pistons in receptacles may continue for numerous cycles. Generators may be coupled to moving portions of an apparatus for generating energy from: (1) movement of fluid; and/or (2) movement of a crank, cams, and/or a lever.

Figure 10:
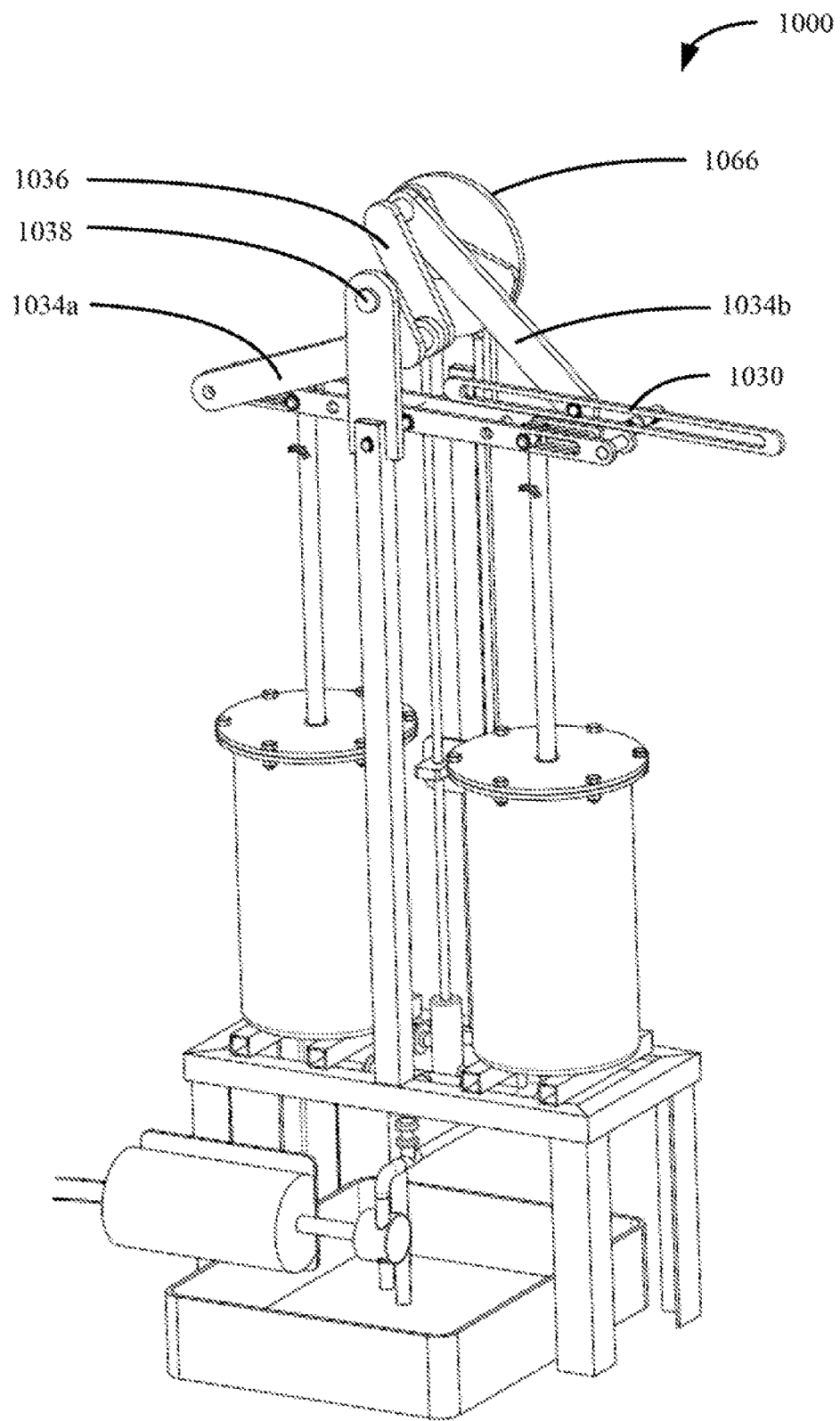
FIG. 10 is a perspective view of an apparatus for generating energy in accordance with another embodiment of the present application.

Reference is now made, to FIG. 10, which is a perspective view of an apparatus 1000 for generating energy in accordance with another embodiment of the present application. The apparatus 1000 of FIG. 10 is similar to the apparatus 100 of FIG. 1. However, the apparatus 1000 of FIG. 10 includes a crank 1036 coupled to a lever 1030 via a first crank arm 1034a and a second crank arm 1034b. The crank 1036 may be rotatable about a crank pivot 1038. Further, the apparatus 1000 may include a pair of cams 1066 coupled to the crank 1036. Accordingly, when the lever 1030 moves in a "see-saw" type fashion about the lever pivot 1032, the first crank arm 1034a and the second crank arm 1034b couples the lever 1030 to the crank 1036 and generates rotational movement of the crank 1036 about the crank pivot 138.

Thus, as illustrated in FIG. 10 (and in contrast to the apparatus of FIG. 1), the crank 1036 and associated components that are coupled to the lever 1030 may be positioned above the lever 1030.

Figure 11C:
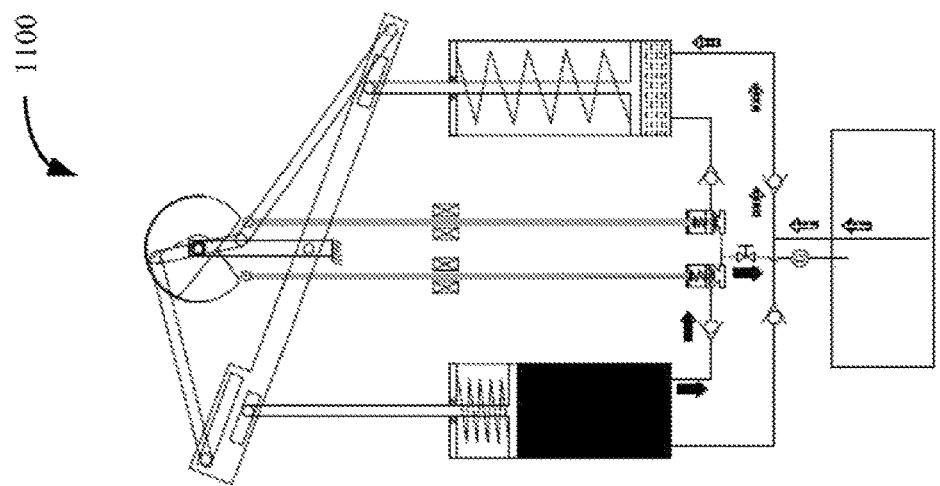
FIGS. 11A, 11B, and 11C are side elevation plan views of the apparatus of FIG. 10 illustrated at three different points in time, respectively, during operation in accordance with an embodiment of the present application.
Figure 11B:
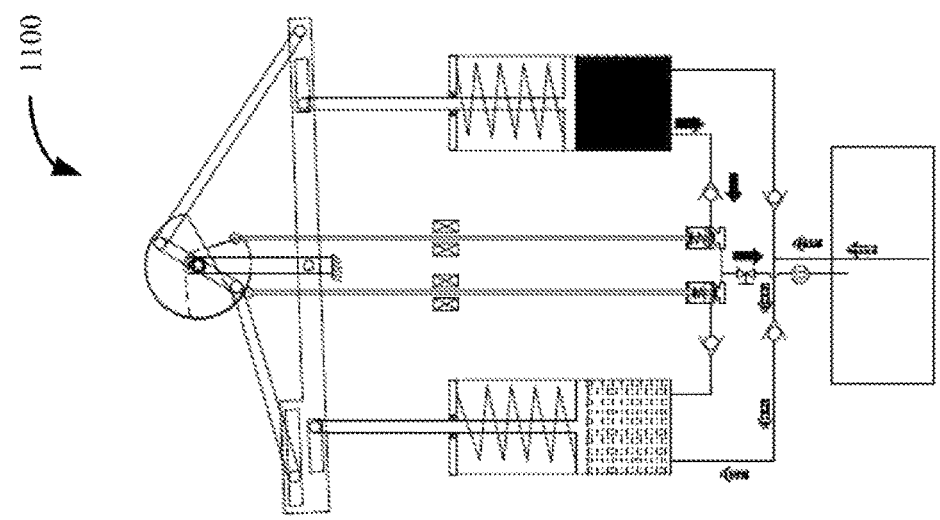
Figure 11A:
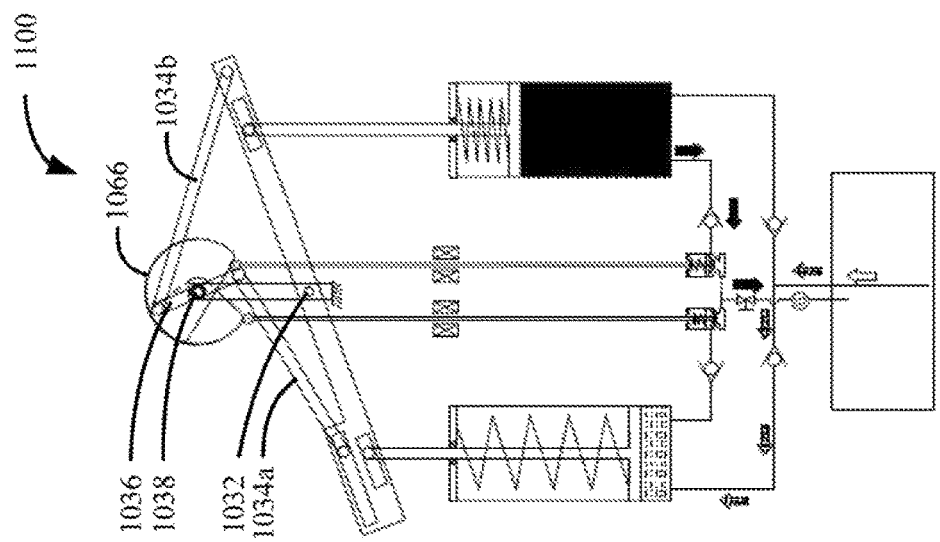

Reference is now made to FIGS. 11A, 11B, and 11C, which are side elevation plan views of an apparatus 1100 in operation and illustrated at different points in time. The apparatus 1100 of FIGS. 11A, 11B, and 11C may be similar to the apparatus 100 of FIG. 1; however, the crank 1036, the pair of cams 1066, the first crank arm 1034a, and the second crank arm 1034b may be positioned above the lever 1030. In an example, FIGS. 11A, 11B, and 11C may correspond to the different points in time illustrated in FIGS. 5A, 5B, and 5C, respectively.

Reference is now made which is a perspective view of a system 1200 for generating energy in accordance with an embodiment of the present application. The system 1200 may include a series of cascaded apparatus for generating energy. For example, each apparatus in the series may be one of the apparatus described above or an apparatus having a combination of the features described in the foregoing description.

For example, the system 1200 may include a first apparatus 1002, a second apparatus 1004, a third apparatus 1006, a fourth apparatus 1008, a fifth apparatus 1010, and a sixth apparatus 1012 for generating energy. In some embodiments, the system 1200 may include the series of apparatus cascaded in parallel. Accordingly, the system 1200 may couple one or more, apparatus to collectively generate electrical energy from multiple apparatus.

In some embodiments, the pistons in each of the apparatus of the series may be synchronized to move upwards or downwards within the respective receptacles in a synchronous manner. In some other embodiments, the pistons in each of the apparatus of the series may move upwards or downwards asynchronously relative to a piston of an adjacent apparatus of the series. For example, pistons of the apparatus of the series may be cascaded or offset so that at a point in time, fluid may be drained or drawn into at least one of the receptacles and a generator coupled to a moving component may generate energy. That is, each lever of apparatus in the series may change movement direction at a different point in time. Accordingly, one or more generators (not illustrated in FIG. 12) may generate electrical energy from flow of fluid from the at least one or more receptacles to a reservoir.

Figure 13:
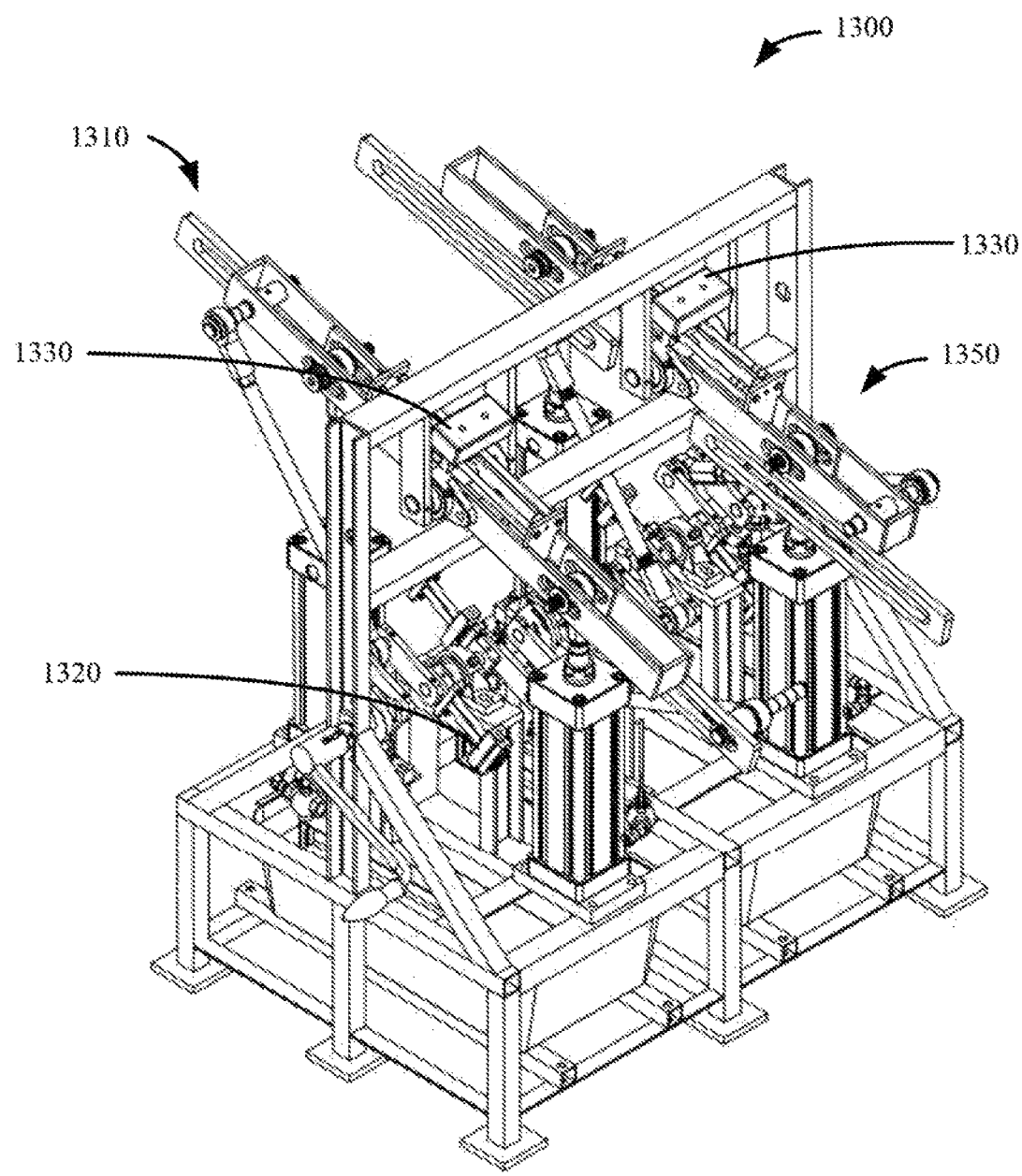
FIG. 13 is a perspective view of a system for generating energy in accordance with an embodiment of the present application.

Reference is now made to FIG. 13, which illustrates a perspective view of a system 1300 for generating energy, in accordance with an example of the present application. The system 1300 may include a first apparatus 1310 and a second apparatus 1350. The first apparatus 1310 and the second apparatus 1350 may be one of the example apparatus described above, or may be an apparatus having a combination of the features described in the foregoing description.

In some examples, the first apparatus 1310 or the second apparatus 1350 may include further features for contributing to movement of the lever in a "see-saw" fashion about a lever pivot. For example, the first apparatus 1310 or the second apparatus 1350 may further include a counterbalance assembly 1320 coupled to a controller of the respective apparatus. In another example, the first apparatus 1310 or the second apparatus may include a sliding mass 1330 along a length of a lever of the respective apparatus. The counterbalance assembly 1320 and the sliding mass 1330 may include moving weights adapted for contributing movement of the lever in a "see-saw" fashion about the lever pivot.

Figure 14:
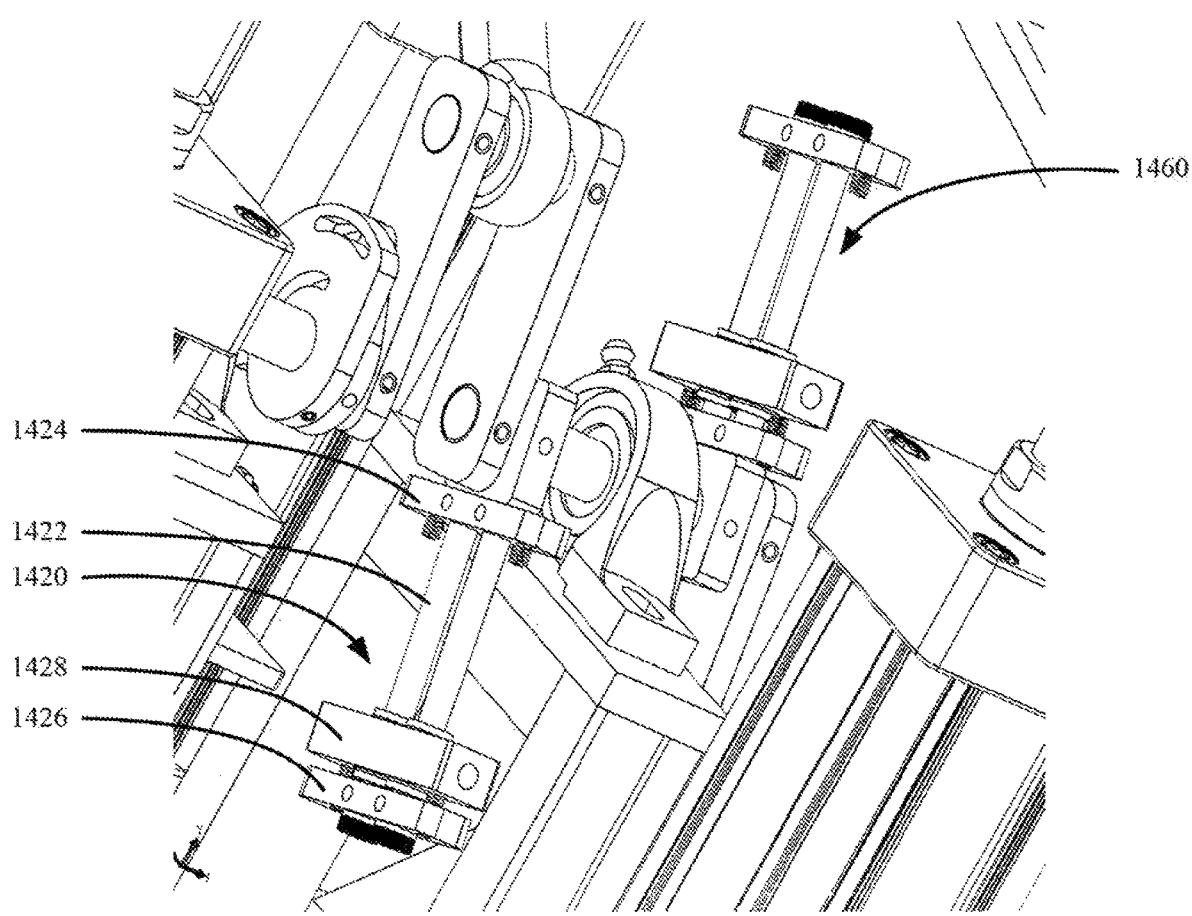
FIG. 14 is a partial perspective view of an apparatus of FIG. 13.

To illustrate the counterbalance assembly 1320, reference is now made to FIG. 14, which is a partial perspective view of the apparatus 1310 of FIG. 13. FIG. 14 includes an illustration of a counterbalance assembly 1420. The counterbalance assembly 1420 may be coupled to a crank (see e.g., crank 1036 of the apparatus 1000 of FIG. 10) and the counterbalance assembly 1420 may track rotational movement of the crank 1036 or cams (see e.g., pair of cams 1066 coupled to the crank 1036 in FIG. 10).

In FIG. 14, the counterbalance assembly 1420 may include a pair of rods 1422 between a first weight stopper 1424 and a second weight stopper 1426. The counterbalance assembly 1420 may also include a movable weight 1428 configured to slide along the pair of rods 1422. That is, the move-able weight 1428 may include a pair of apertures, and the pair of rods 1422 may be threaded through the pair of apertures such that the moveable weight 1428 may slide between the first weight stopper 1424 and the second weight stopper 1426. Although the pair of rods 1422 is illustrated as being two adjacent rods, any number of rods may be used such that the moveable weight 1428 may slide between the first weight stopper 1424 and the second weight stopper 1426.

The moveable weight 1428 may slide along the pair of rods 1422 in response to gravitational force acting on the moveable weight 1428. Accordingly, as the crank or cams of the apparatus rotate, the moveable weight 1428 may slide between the first weight stopper 1424 and the second weight stopper 1426 such that the moveable weight 1428 may contribute to and impart movement of the lever (not illustrated in FIG. 14) about the lever pivot (not illustrated in FIG. 14). In some examples, additional counterbalance assemblies 1460 may be coupled to the controllers for contributing to and imparting movement of respective levers. For example, additional counterbalance assemblies may be coupled to other counterbalance assemblies in opposing directions about respective controllers of respective apparatus.

Figure 15A:
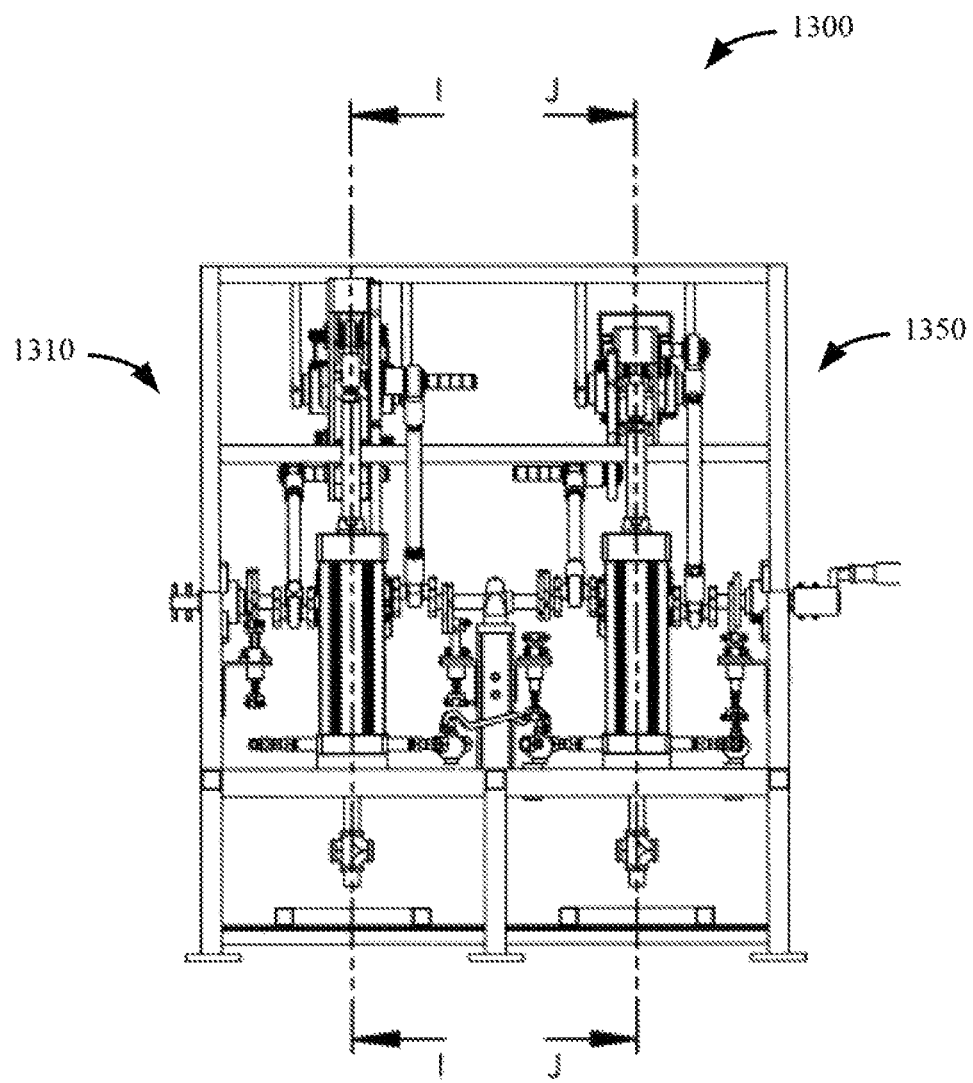
FIG. 15A is a front elevation view of the system of FIG. 13.

Reference is now made to FIG. 15A, which illustrates a front elevation view of the system 1300 of FIG. 15A, FIG. 15A illustrates a line I-I and a line J-J corresponding to views in FIG. 15B and FIG. 15C.

FIG. 15B is a side elevation sectional view of the first apparatus 1310 illustrated in FIG. 15A taken along the line I-I. FIG. 15C is a side elevation sectional view of the second apparatus 1350 illustrated in FIG. 15A taken, along the line J-J. The pistons in the first apparatus 1310 may move upwards or downwards asynchronously relative to the pistons in the second apparatus 1350. Accordingly, the apparatus in the system 1300 may be cascaded or offset, such that at a given time, at least one or more of the apparatus may generate energy from fluid flow to and from the reservoir (reservoir not explicitly illustrated in FIGS. 15A, 15B, and 15C).

In FIGS. 15B and 15C, the first apparatus 1310 and the second apparatus 1350 may include one or more counterweight assembly 1320 coupled to a crank, crank assembly, or cams and the counterbalance assembly 1320 may track rotational movement of the crank, crank assembly, or cams. As described above, a moveable weight of the counterbalance assembly 1320 may slide along a pair of rods in response to gravitational force acting on the moveable weight. Accordingly, the moveable weight 1428 may contribute to and impart movement on the lever about the lever pivot.

In some examples, the first apparatus 1310 and the second apparatus 1350 may also include the sliding mass 1330 coupled along the lever 1302 of the respective apparatus. The sliding mass 1330 may be adapted to slide along a rail 1332, where the rail 1332 may be adjacent to and parallel to the lever 1302. As described above, the counterbalance assembly 1320 or the sliding mass 1330 may be adapted for contributing to and imparting movement of the lever in the "see-saw", fashion so as to enable alternating and opposing movement of pistons in receptacles of the respective first apparatus 1310 and the second apparatus 1350. Generators may be coupled to moving portions of the respective first apparatus 1310 and the second apparatus 1350 for generating energy from: (1) movement of fluid; and/or (2) movement of a crank, cams, and/or a lever.

The foregoing description describes example apparatus having alternating states where fluid may: (1) be drawn into receptacles of example apparatus from a reservoir; and (2) be drained from receptacles of example apparatus to the reservoir. In some examples, the apparatus may be a component of a pump system where fluid may be drawn from one receptacle and drained into a subsequent receptacle downstream from a prior receptacle in a system. In another example, the apparatus may be a component of a filtration system, where the apparatus may include a filtration module such that fluid drawn in from one receptacle may be passed through the filtration module prior to being drained into a subsequent receptacle downstream from the prior receptacle in the system.

Certain adaptations and modifications of the described embodiments can be made. Therefore, the above discussed embodiments are considered to be illustrative and not restrictive.

What is claimed is:

1. An apparatus for generating energy by intake and drainage of a fluid, the apparatus comprising:
   a reservoir for receiving at least a portion of the fluid;
   a pair of receptacles in fluid communication with the reservoir and mounted above the reservoir, each of the pair of receptacles having a variable volume for holding the fluid, the variable volume controlled by movable portions positioned inside each of the pair of receptacles;
   a lever rotatable about a lever pivot, the lever coupled at a first side of the lever pivot to the movable portions associated with a first one of the pair of receptacles and coupled at a second side of the lever pivot to the movable portions associated with a second one of the pair of receptacles, such that movement of the movable portions that decrease the variable volume in the first one of the pair of receptacles induces, via the lever, a corresponding movement of the moveable portions which increases the variable volume in the second one of the pair of receptacles;
   control valves controlling the fluid communication between the pair of receptacles and the reservoir;
   a controller coupled to the control valves, the controller configured to alternatingly configure one of the pair of receptacles to enable draining to the reservoir while configuring another of the pair of receptacles to prevent draining to the reservoir but to allow suction from the reservoir; and
   a generator coupled to moving portions and activated by communication of fluids between the pair of receptacles and the reservoir.

2. The apparatus of claim 1, further comprising a crank coupled to the lever and rotatable about a crank pivot, such that movement of the lever generates rotational movement of the crank about the crank pivot.

3. The apparatus of claim 2, wherein the generator is coupled to the crank to translate physical movement of the moveable portions of the pair of receptacles, via the crank, into electrical energy.

4. The apparatus of claim 2, wherein the controller includes:
   a pair of cam followers, each of the pair of cam followers being in communication at one end with one of the control valves; and
   a pair of cams coupled to the crank and rotatable about the crank pivot, each cam rotating adjacent another of the pair of cams, each cam being in communication with another end of one of the pair of cam followers, each cam translating rotary motion to linear motion through one of the pair of cam followers to the control valves, such that the pair of cams configure the control valves to enable draining or to prevent draining of each of the pair of receptacles to the reservoir.

5. The apparatus of claim 4, wherein each of the pair of cams includes a first engagement portion for translating rotary motion into a first linear distance and a second engagement portion for translating rotary motion into a second linear distance, and wherein a part of the first engagement portion of a first one of the pair of cams coincides with a part the second engagement portion of a second one of the pair of cams, and wherein a part of the second engagement portion of the first one of the pair of cams coincides with a part of the first engagement portion of the second one of the pair of cams, such that rotation of the pair of cams translates, via the pair of cam followers, a first linear distance to one of the control valves while translating a second linear distance to another of the control valves to alternatingly configure one of the pair of receptacles to enable draining while another of the pair of receptacles to prevent draining.

6. The apparatus of claim 1, wherein the controller includes:

a pair of fluid level sensors affixed to receptacle walls and in communication with the control valves, each of the pair of fluid level sensors being configured to detect a fluid volume increasing beyond a first threshold in a respective receptacle of the pair of receptacles, and when one of the pair of fluid level sensors detects the fluid volume increasing beyond the first threshold in the respective receptacle of the pair of receptacles, the one of the pair of fluid level sensors transmits a switch signal to the control valves to switch from enabling passage of the fluid to preventing drainage of the fluid in one of the control valves while switching from preventing drainage of the fluid to enabling passage of the fluid in another of the control valves.

7. The apparatus of claim 1, wherein the movable portions in each of the pair of receptacles includes a piston that is movable within respective receptacles such that the variable volume for holding the fluid increases or decreases.

8. The apparatus of claim 7, wherein the piston has a piston perimeter edge in sliding communication with receptacle walls when the piston moves within respective receptacles.

9. The apparatus of claim 7, wherein the movable portions in each of the pair of receptacles further includes a spring, the spring being coupled at one end to a top cover of the respective receptacles and at another end to the piston of the respective receptacles for generating a compression force to decrease the variable volume.

10. The apparatus of claim 1, wherein each of the pair of receptacles includes a drainage outlet in fluid communication with the reservoir, and wherein the generator is a hydroelectric generator coupled at the drainage outlet for generating electrical energy.

11. The apparatus of claim 10, wherein the hydroelectric generator includes an impeller rotatable about an impeller pivot at the drainage outlet, such that drainage to the reservoir rotates the impeller.

12. The apparatus of claim 1, wherein each of the pair of receptacles further includes a drainage conduit passing through a respective control valve to the reservoir, such that the fluid drains by gravitational force to the reservoir when at least one of the control valves is in an open mode.

13. The apparatus of claim 12, further comprising:
a drainage collection conduit merging the drainage conduit from each of the pair of receptacles to the reservoir.

14. The apparatus of claim 13, further comprising:
a variable flow valve fitted on the drainage collection conduit controlling speed of fluid flow draining from the pair of receptacles to the reservoir.

15. The apparatus of claim 13, wherein each of the pair of receptacles further includes:
a suction conduit in communication with the reservoir; and
a one-way check valve within the suction conduit preventing fluid flow from each of the pair of receptacles to the reservoir.

16. The apparatus of claim 15, wherein the suction conduit of each of the pair of receptacles that is in communication with the reservoir is immersed in the fluid of the reservoir, and wherein the drainage collection conduit that is in communication with the reservoir is not immersed in the fluid of the reservoir.

17. The apparatus of claim 1, wherein the control valves include:
a first control valve controlling drainage of fluid from one of the pair of receptacles to the reservoir, the first control valve including an open mode and a closed mode; and
a second control valve controlling drainage of fluid from another of the pair of receptacles to the reservoir, the second control valve including an open mode and a closed mode.

18. The apparatus of claim 1, further comprising a winding mechanism coupled to the lever for initializing movement in the lever, the winding mechanism being disengageable from the lever once the lever is in motion.

19. The apparatus of claim 18, wherein the winding mechanism includes a ratchet and pawl.

20. The apparatus of claim 1, wherein the fluid is a non-compressible fluid.

* * * * *